(12) United States Patent
Nishiyama et al.

(10) Patent No.: US 6,288,191 B1
(45) Date of Patent: Sep. 11, 2001

(54) ETHYLENE-ISOPRENE RANDOM COPOLYMER

(75) Inventors: Tadaaki Nishiyama; Atsuko Ogawa, both of Chiba (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/261,506

(22) Filed: Mar. 3, 1999

(30) Foreign Application Priority Data

Mar. 6, 1998 (JP) .................................................. 10-055467

(51) Int. Cl.[7] .................................................. C08F 236/08
(52) U.S. Cl. ........................ 526/339; 526/132; 526/134; 526/160; 526/340.2; 526/943
(58) Field of Search ................. 526/339, 340.2

(56) References Cited

U.S. PATENT DOCUMENTS

| 3,883,493 | * | 5/1975 | Yamao et al. | ........................ | 260/85.3 |
| 3,935,175 | * | 1/1976 | Lugli et al. | ........................ | 260/82.1 |
| 4,035,444 |   | 7/1977 | Yang . | | |
| 4,288,581 |   | 9/1981 | Wieder et al. . | | |
| 6,084,046 | * | 7/2000 | Johoji et al. | ........................ | 526/339 |

FOREIGN PATENT DOCUMENTS

0 283 067 A1   9/1988 (EP) .
48-56775       8/1973 (JP) .

OTHER PUBLICATIONS

Lee et al., Copolymerizations of Olefins and Dienes with Homogeneous and Heterogeneous Catalysts, Eur. Polym. J. 33(4), pp. 447–451, 1997.*
Patent Abstracts of Japan C–165, p. 51, JP 58–029893 A (Nippon Yushi K. K.) Feb. 22, 1983.
Derwent Abstract Accession No. 91–129570, Class A35, JP 3–069342 A (Mitsubishi Kasei Corp) Aug. 9, 1989.
Derwent Abstract Accession Accession No. 94–012332, Class A17, JP 5–320259 A (Idemitsu Kosan Co Ltd) Dec. 3, 1993.
Derwent Abstract Accession No. 96–422009, Class A17, JP 8–208732 A (Sumitomo Chem Co Ltd) Aug. 13, 1996.
Lee, et al., "Copolymerizations of Olefins and Dienes with Homogeneous and Heterogeneous Catalysts", Eur. Polym. J., vol. 33, No. 4, 1997, pp. 447–451.

* cited by examiner

Primary Examiner—David W. Wu
Assistant Examiner—R. Rabago
(74) Attorney, Agent, or Firm—Fitch, Even, Tabin & Flannery

(57) ABSTRACT

The present invention relates to an ethylene-isoprene random copolymer having an isoprene content of about 1 to 45% by mole, or an ethylene-isoprene copolymer having a Q-value of about 3.5 or less, wherein the Q-value is a ratio of weight average molecular weight (Mw) to number average molecular weight (Mn) The copolymer may be made using a catalyst comprising a compound of formula I, II or III, wherein $M^1$ is a group IV transition metal, J is a group XIV atom, A and $X^3$ are group XVI atoms, and $Cp^1$ is a cyclopentadienyl-type group.

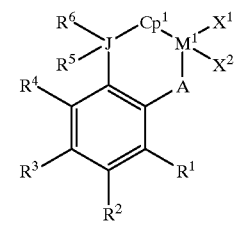

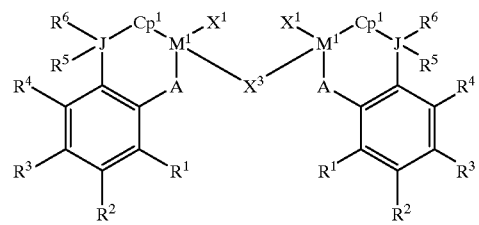

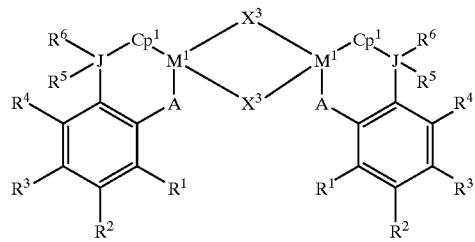

18 Claims, 3 Drawing Sheets

ETHYLENE-ISOPRENE RANDOM COPOLYMER

BACKGROUND OF THE INVENTION

1. Field of the Invention

The present invention relates to an ethylene-isoprene random copolymer, an elastomer composition and a cross-linked elastomer composition. More particularly, the present invention relates to an ethylene-isoprene random copolymer having a fast cure rate and a high crosslinking density, an elastomer composition and a cross-linked elastomer composition obtained by using said ethylene-isoprene random copolymer. The term "random copolymer" as used herein refers to a copolymer in which an arrangement of monomer units is random (see, "Essential Highpolymer Science", page 21, published by Kodansha, written by Seiichi Nakahama et al.).

2. Description of Related Art

Heretofore, JP-B-48-56775 disclosed a process for producing an ethylene-isoprene amorphous copolymer using a vanadium chloride compound, and an ethylene-isoprene copolymer having an isoprene content of 50–80% by mole obtained by said process. In addition, Dong-Ho Lee et al disclosed a process for producing an ethylene-isoprene copolymer using ethylenebisindenylzirconium dichloride ($Et(Ind)_2ZrCl_2$) modified methylaluminoxane catalyst system, and an ethylene-isoprene copolymer having an isoprene content of 0.9% by mole obtained by said process (Eur. Polym. Jour., Vol. 33, No. 4, pp. 447, 1997). However, no ethylene-isoprene copolymer having a fast cure rate and a high crosslinking density has been known.

SUMMARY OF THE INVENTION

The present inventors have conducted extensive studies for obtaining an ethylene-isoprene random copolymer having the characteristics of a fast cure rate and a high crosslinking density. As the result, the present inventors have found that an ethylene-isoprene random copolymer having an isoprene content of about 1 to 45% by mole has a fast cure rate and a high crosslinking density, and have thus completed the present invention. The fast cure rate enables a decrease in costs for vulcanization steps or in post cure, as well as decrease the amount of vulcanization agent needed to be used. In addition, the high crosslinking density brings advantages, in that the provided copolymer allows for the production of a sponge rubber that is highly foamed and has a high stiffness, which it is excellent in low-temperature setting property and oil resistance and that allows for high filling, thereby also allowing for a decrease in costs.

Accordingly, the present invention relates to an ethylene-isoprene random copolymer having an isoprene content of about 1 to 45% by mole, or an ethylene-isoprene copolymer having a Q-value of about 3.5 or less, wherein the Q-value is a ratio of the weight average molecular weight (Mw) to the number average molecular weight (Mn).

The present invention also relates to an elastomer composition comprising about 100 parts by weight of said ethylene-isoprene random copolymer, about 5 to 400 parts by weight of an inorganic filler and/or carbon black and about 0.1 to 20 parts by weight of a cross-linking agent.

The present invention also relates to a cross-linked elastomer composition obtained by cross-linking said elastomer composition.

DETAILED DESCRIPTION OF THE INVENTION

Figure 1:
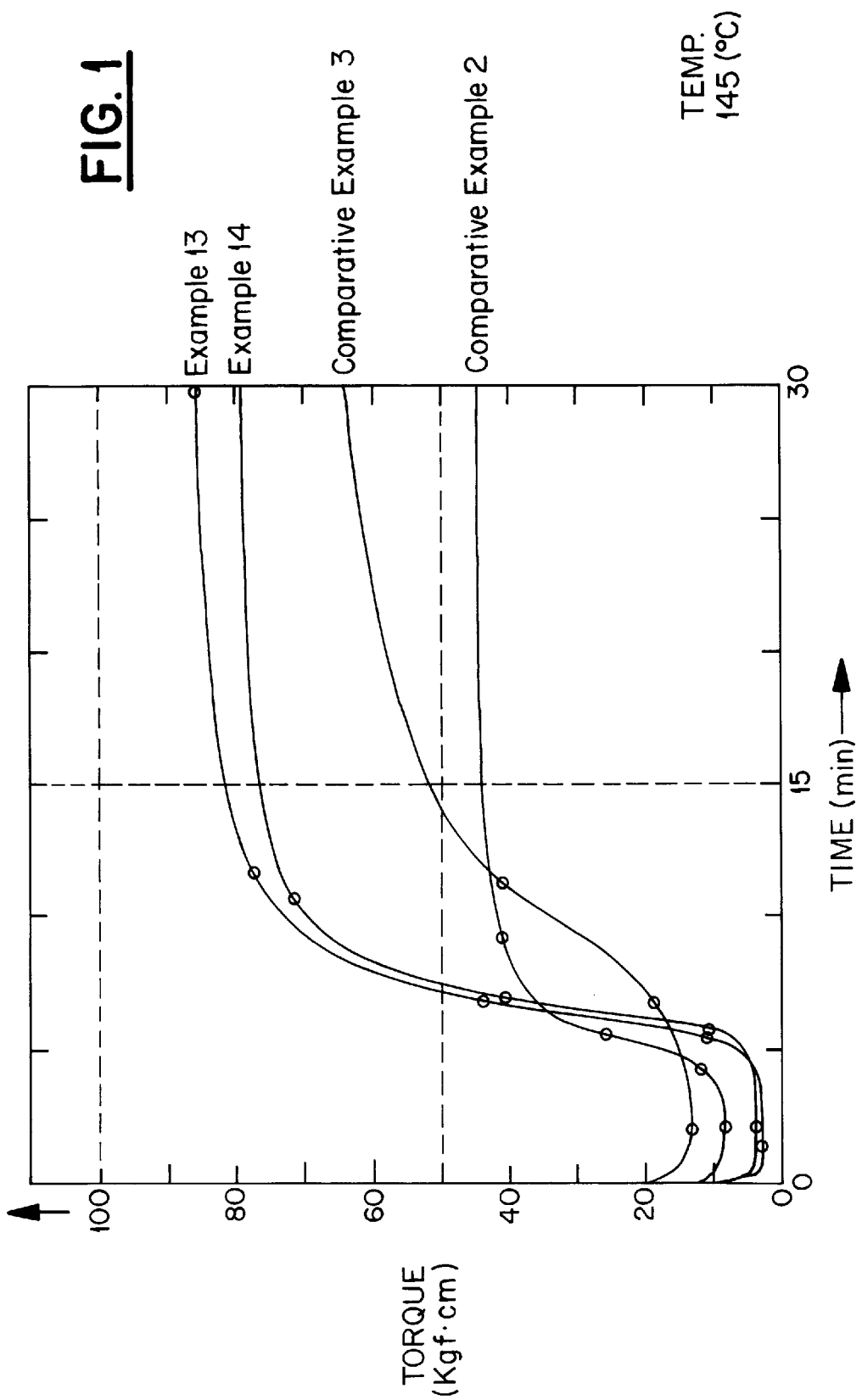
FIG. 1 shows the results of oscillating disc rheometer measurement of the copolymers of Example 12 and Example 9.
Figure 2:
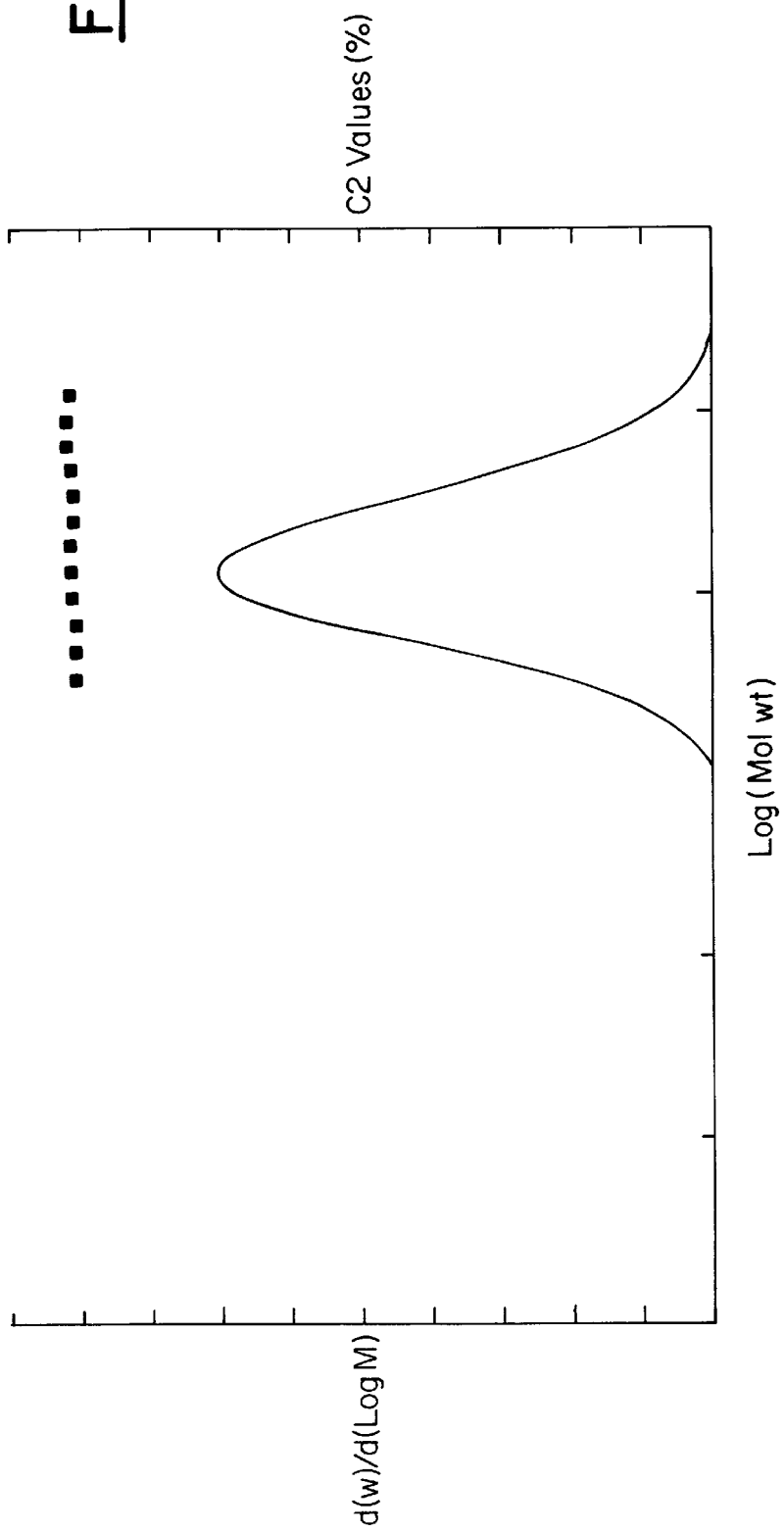
FIG. 2 shows the result of a GPC-IR measurement of the copolymer of Example 6.
Figure 3:
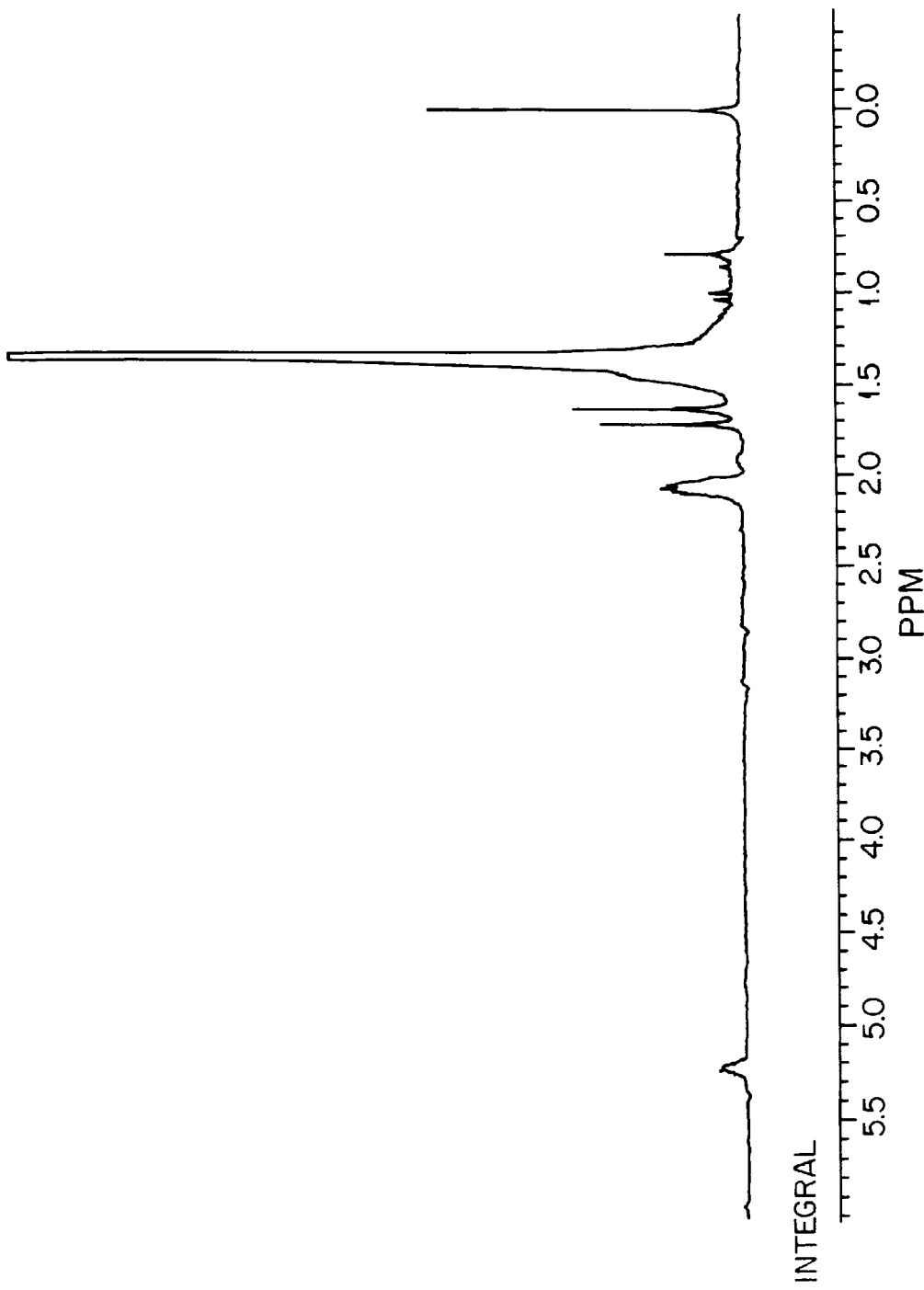
FIG. 3 shows the result of a $^1$H-NMR measurement of the copolymer of Example 6.

The following detailed description is provided as an aid to those desiring to practice the present invention as claimed. This disclosure is not to be construed as being limiting to the present invention, however, as those skilled in the art will readily understand that various changes can be made in the materials and procedures set forth herein without departing from the spirit or scope of the present inventive discovery.

An ethylene-isoprene random copolymer according to the present invention is an ethylene-isoprene random copolymer having an isoprene content of about 1 to 45% by mole, preferably of about 1.2 to 40% by mole, more preferably of about 1.5 to 35% by mole. When the content of isoprene is too low, the vulcanization becomes insufficient, and to the contrary, when the content of isoprene is too high, the activity of catalyst and the molecular weight become lower and the crosslinking density also lowers.

In addition, the ethylene-isoprene copolymer of the present invention is an ethylene-isoprene copolymer having a Q-value, which is a ratio of number average molecular weight (Mn) to weight average molecular weight (Mw), of about 3.5 or less, preferably of about 1.8 to 3.5, more preferably of about 1.8 to 2.5. When the Q-value is too large, problems arise including decrease in strength, an increase in bleeding components, a film stickiness due to an increase in extracting components and the like. Moreover, when it is used as a rubber of low density, problems in its practical use arise including a lowering of its physical properties for cross-linking, for example, compression set, tensile rigidity and the like.

The molecular weight distribution was measured by a gel permeation chromatography (GPC) method (using a GPC apparatus 150C, manufactured by Waters Co.) as described later.

The ethylene-isoprene copolymer of the present invention is characterized in that it has an almost uniform ratio of ethylene and isoprene contents for molecular weight distributions ranging from the lower molecular weight region to the higher molecular weight region thereof, and it also has a narrow compositional distribution.

The ethylene-isoprene copolymer of the present invention has an intrinsic viscosity [η] preferably of 0.3 or more, more preferably of 0.5 or more, as measured in xylene solvent at a temperature of 70° C. When the intrinsic viscosity thereof is too low, the obtained ethylene-isoprene copolymer may be poor in physical properties and processability. The method for measuring the intrinsic viscosity [η] is described later.

The ethylene-isoprene copolymer of the present invention is preferably produced by using a catalyst comprising (A) and (B), (A) and (C), or (A), (B) and (C). When this process is used, contamination of catalyst residue into the polymer is decreased, and the content of chlorine is particularly low when compared with the conventional case in which the Ziegler-Natta catalyst is used. This invention allows for a prevention of color change in polymers and has an effect on an extension of application such as food application and the like.

(A): at least one transition metal complex represented by the following formula [I], [II] or [III]:

[Structural formulas [I], [II], and [III] showing transition metal complexes with Cp¹, M¹, X¹, X², A, J, and R¹–R⁶ substituents on aromatic rings]

wherein $M^1$ represents a transition metal atom of group IV in the Periodic Table of the Elements; A represents an atom of group XVI in the Periodic Table of the Elements; J represents an atom of group XIV in the Periodic Table of the Elements; $Cp^1$ represents a group having a cyclopentadiene type anion skeleton; $X^1$, $X^2$, $R^1$, $R^2$, $R^3$, $R^4$, $R^5$ and $R^6$ independently represent a hydrogen atom, a halogen atom, an alkyl group, an aralkyl group, an aryl group, a substituted silyl group, an alkoxygroup, an aralkyloxy group, an aryloxy group, or a disubstiuted amino group; and $R^1$, $R^2$, $R^3$, $R^4$, $R^5$ and $R^6$ may be combined optionally to form a ring.

$X^3$ represents an atom of group XVI in the Periodic Table of Elements; Two of $M^1$, A, J, $Cp^1$, $X^1$, $X^2$, $X^3$, $R^1$, $R^2$, $R^3$, $R^4$, $R^5$ and $R^6$ may be the same or different:

(B): one or more of aluminum compounds selected from the following (B1)—(B3):
  (B1) An organoaluminum compound represented by the general formula $E^1{}_aAlZ_{3-a}$,
  (B2) cyclic aluminoxane represented by the general formula $\{-Al(E^2)-O-\}_b$ and
  (B3) linear aluminoxane represented by the general formula $E^3\{-Al(E^3)-O-\}_c AlE^3{}_2$ (wherein $E^1$, $E^2$ and $E^3$ respectively represent a hydrocarbon group and each of the $E^1$, $E^2$ and $E^3$ groups may be the same or different; Z represents a hydrogen atom or a halogen atom and each of the Z groups may be the same or different; a satisfies the following equation: $0 < a \leq 3$; b represents an integer of 2 or more; and c represents an integer of 1 or more.)

(C): any one boron compound of the following (C1)–(C3):
  (C1) a boron compound represented by the general formula $BQ^1Q^2Q^3$,
  (C2) a boron compound represented by the general formula $G^+(BQ^1Q^2Q^3Q^4)^-$ and
  (C3) a boron compound represented by the general formula $(L-H)^+(BQ^1Q^2Q^3Q^4)^-$ (wherein B represents a trivalent boron atom in the valence state; $Q^1$ to $Q^4$ may each be the same or different andrepresent a halogen atom, a hydrocarbon group, a halogenated hydrocarbon group, a substituted silyl group, an alkoxy group or a disubstituted amino group; $G^+$ is an inorganic or organic cation; L is a neutral Lewis base; and $(L-H)^+$ is a Bronsted acid.)

Hereinafter, the present invention will be described in more detail.

(A) Transition metal complex is explained.

In the general formula [I], [II] and [III], the transition metal atom represented by $M^1$ is a transition metal element of group IV in the Periodic Table of the Elements (Revised Version 1989 of IUPAC, Inorganic Chemistry Nomenclature) and examples thereof include a titanium atom, a zirconium atom, a hafnium atom, or the like, preferably a titanium atom or a zirconium atom.

Examples of the atom of the group XVI in the Periodic Table of the element represented by "A" in the general formula [I], [II] or [III] include an oxygen atom, a sulfur atom, a selenium atom, etc., and preferably an oxygen atom.

Examples of the atom of group XIV in the Periodic Table of the element representedby "J" in the general formula [I], [II] or [III] include a carbon atom, a silicon atom, agermanium atom and the like, preferably a carbon atom or a silicon atom.

Examples of the group having a cyclopentadiene type anion skeleton represented by the substituent $Cp^1$ include a $\eta^5$-(substituted)cyclopentadienyl group, $\eta^5$-(substituted) indenyl group, $\eta^5$-(substituted)fluorenyl group, etc. Examples thereof are $\eta^5$-cyclopentadienyl group, $\eta^5$-methylcyclopentadienyl group, $\eta^5$-dimethylcyclopentadienyl group, $\eta^5$-trimethylcyclopentadienyl group, $\eta^5$-tetramethylcyclopentadienyl group, $\eta^5$-ethylcyclopentadienyl group, $\eta^5$-n-propylcyclopentadienyl group, $\eta^5$-isopropylcyclopentadienyl group, $\eta^5$-n-butylcyclopentadienyl group, $\eta^5$-sec-butylcyclopentadienyl group, $\eta^5$-tert-butylcyclopentadienyl group, $\eta^5$-n-pentylcyclopentadienyl group, $\eta^5$-neopentylcyclopentadienyl group, $\eta^5$-n-hexylcyclopentadienyl group, $\eta^5$-n-octylcyclopentadienyl group, $\eta^5$-n-phenylcyclopentadienyl group, $\eta^5$-naphthylcyclopentadienyl group, $\eta^5$-trimethylsilylcyclopentadienyl group, $\eta^5$-triethylsilylcyclopentadienyl group, $\eta^5$-tert-butyldimethylsilylcyclopentadienyl group, $\eta^5$-indenyl group, $\eta^5$-methylindenyl group, $\eta^5$-dimethylindenyl group, $\eta^5$-ethylindenyl group, $\eta^5$-n-propylindenyl group, $\eta^5$-isopropylindenyl group, $\eta^5$- n-butylindenyl group, $\eta^5$-sec-butylindenyl group, $\eta^5$-tert-butylindenyl group, $\eta^5$-n-pentylindenyl group, $\eta^5$-neopentylindenyl group, $\eta^5$-n-hexylindenyl group, $\eta^5$-n-octylindenyl group, $\eta^5$-n-decylindenyl group, $\eta^5$-phenylindenyl group, $\eta^5$-methylphenylindenyl group, $\eta^5$-naphthylindenyl group, $\eta^5$-trimethylsilylindenyl group, $\eta^5$-triethylsilylindenyl group, $\eta^5$-tert-butyldimethylsilylindenyl group, $\eta^5$-tetrahydroindenyl group, $\eta^5$-fluorenyl group, $\eta^5$-methylfluorenyl group, $\eta^5$-dimethylfluorenyl group, $\eta^5$-ethylfluorenyl group, $\eta^5$-diethylfluorenyl group, $\eta^5$n-propylfluorenyl group, $\eta^5$-di-n-propylfluorenyl group, $\eta^5$-isopropylfluorenyl group, $\eta^5$-diisopropylfluorenyl group, $\eta^5$-n-butylfluorenyl group, $\eta^5$-sec-butylfluorenyl group, $\eta^5$-tert-butylfluorenyl group, $\eta^5$-di-n-butylfluorenyl group, $\eta^5$-di-sec-butylfluorenyl group, $\eta^5$-di-tert-butylfluorenyl group, $\eta^5$-n-pentylfluorenyl group, $\eta^5$-neopentylfluorenyl group, $\eta^5$-n-hexylfluorenyl group, $\eta^5$-n-octylfluorenyl group, $\eta^5$-n-decylfluorenyl group, $\eta^5$-n-dodecylfluorenyl group, $\eta^5$-phenylfluorenyl group, $\eta^5$-di-phenylfluorenyl group, $\eta^5$-methylphenylfluorenyl group, $\eta^5$-naphthylfluorenyl group, $\eta^5$-trimethylsilylfluorenyl group, $\eta^5$-bis-trimethylsilylfluorenyl group, $\eta^5$-triethylsilylfluorenyl group, $\eta^5$-tert-butyldimethylsilylfluorenyl group, etc., preferably a $\eta^5$-cyclopentadienyl group, $\eta^5$-methylcyclopentadienyl group, $\eta^5$-tert-butylcyclopentadienyl group, $\eta^5$-tetramethylcyclopentadienyl group, $\eta^5$-indenyl group and $\eta^5$-fluorenyl group.

Examples of the halogen atom in the substituents $X^1$, $X^2$, $R^1$, $R^2$, $R^3$, $R^4$, $R^5$ and $R^6$ include a fluorine atom, chlorine atom, bromine atom, iodine atom and the like, preferably a chlorine atom or a bromine atom, more preferably a chlorine atom.

As the alkyl group in the substituents $X^1$, $X^2$, $R^1$, $R^2$, $R^3$, $R^4$, $R^5$ and $R^6$, an alkyl group having carbon atoms of 1–20 in is preferable. Examples of such an alkyl group include methyl group, ethyl group, n-propyl group, isopropyl group, n-butyl group, sec-butyl group, tert-butyl group, n-pentyl group, neopentyl group, amyl group, n-hexyl group, n-octyl group, n-decyl group, n-dodecyl group, n-pentadecyl group, n-eicosyl group, etc., preferably a methyl group, ethyl group, isopropyl group, tert-butyl group or amyl group.

These alkyl groups may be substituted with a halogen atom such as a fluorine atom, chlorine atom, bromine atom, iodine atom or the like. Examples of alkyl groups having 1–20 carbon atoms substituted with halogen atom(s) include a fluoromethyl group, difluoromethyl group, trifluoromethyl group, chloromethyl group, dichloromethyl group, trichloromethyl group, bromomethyl group, dibromomethyl group, tribromomethyl group, iodomethyl group, diiodomethyl group, triiodomethyl group, fluoroethyl group, difluoroethyl group, trifluoroethyl group, tetrafluoroethyl group, pentafluoroethyl group, chloroethyl group, dichloroethyl group, trichloroethyl group, tetrachloroethyl group, pentachloroethyl group, bromoethyl group, dibromoethyl group, tribromoethyl group, tetrabromoethyl group, pentabromoethyl group, perfluoropropyl group, perfluorobutyl group, perfluoropentyl group, perfluorohexyl group, perfluorooctyl group, perfluorododecyl group, perfluoropentadecyl group, perfluoroeicosyl group, perchloropropyl group, perchlorobutyl group, perchloropentyl group, perchlorohexyl group, perchlorooctyl group, perchlorododecyl group, perchloropentadecyl group, perchloroeicosyl group, perbromopropyl group, perbromobutyl group, perbromopentyl group, perbromohexyl group, perbromooctyl group, perbromododecyl group, perbromopentadecyl group, perbromoeicosyl group or the like.

These alkyl groups may be partially substituted by an alkoxy group such as a methoxy group, ethoxy group, an aryloxy group (such as phenoxy group), or aralkyloxy group (such as benzyloxy group), etc.

As the aralkyl group in the substituents $X^1$, $X^2$, $R^1$, $R^2$, $R^3$, $R^4$, $R^5$ and $R^6$, an aralkyl group having 7–20 carbon atoms is preferable. Examples of such aralkyl groups include a benzyl group, (2-methylphenyl)methyl group, (3-methylphenyl)methyl group, (4-methylphenyl)methyl group, (2,3-dimethylphenyl)methyl group, (2,4-dimethylphenyl)methyl group, (2,5-dimethylphenyl)methyl group, (2,6-dimethylphenyl)methyl group, (3,4-dimethylphenyl)methyl group, (4,6-dimethylphenyl)methyl group, (2,3,4-trimethylphenyl)methyl group, (2,3,5-trimethylphenyl)methyl group, (2,3,6-trimethylphenyl) methyl group, (3,4,5-trimethylphenyl)methyl group, (2,4,6-trimethylphenyl)methyl group, (2,3,4,5-tetramethylphenyl) methyl group, (2,3,4,6-tetramethylphenyl)methyl group, (2,3,5,6-tetramethylphenyl)methyl group, (pentamethylphenyl)methyl group, (ethylphenyl)methyl group, (n-propylphenyl)methyl group, (isopropylphenyl) methyl group, (n-butylphenyl)methyl group, (sec-butylphenyl)methyl group, (tert-butylphenyl)methyl group, (n-pentylphenyl)methyl group, (neopentylphenyl)methyl group, (n-hexylphenyl)methyl group, (n-octylphenyl)methyl group, (n-decylphenyl)methyl group, (n-dodecylphenyl) methyl group, (n-tetradecylphenyl)methyl group, naphthylmethyl group, anthracenylmethyl group, etc., and preferably a benzyl group.

These aralkyl groups may be partially substituted with a halogen atom such as a fluorine atom, chlorine atom, bromine atom, iodine atom, alkoxy group such as a methoxy, ethoxy, aryloxy group (such as phenoxy), or aralkyloxy group (such as benzyloxy), or the like.

As the aryl group in the substituents $X^1$, $X^2$, $R^1$, $R^2$, $R^3$, $R^4$, $R^5$ and $R^6$, the aryl group having 6–20 carbon atoms is preferable. Examples of such aryl groups include a phenyl group, 2-tolyl group, 3-tolyl group, 4-tolyl group, 2,3-xylyl group, 2,4-xylyl group, 2,5-xylyl group, 2,6-xylyl group, 3,4-xylyl group, 3,5-xylyl group, 2,3,4-trimethylphenyl group, 2,3,5-trimethylphenyl group, 2,3,6-trimethylphenyl group, 2,4,6-trimethylphenyl group, 3,4,5-trimethylphenyl group, 2,3,4,5-tetramethylphenyl group, 2,3,4,6-tetramethylphenyl group, 2,3,5,6-tetramethylphenyl group, pentamethylphenyl group, ethylphenyl group, n-propylphenyl group, isopropylphenyl group, n-butylphenyl group, sec-butylphenyl group, tert-butylphenyl group, n-pentylphenyl group, neopentylphenyl group, n-hexylphenyl group, n-octylphenyl group, n-decylphenyl group, n-dodecylphenyl group, n-tetradecylphenyl group, naphthyl group, anthracenyl group, etc., and preferably a phenyl group.

These aryl groups may be partially substituted with a halogen atom such as fluorine atom, chlorine atom, bromine atom, iodine atom, alkoxy group such as a methoxy, ethoxy, aryloxy group (such as phenoxy), or aralkyloxy group (such as benzyloxy), and the like.

The substituted silyl group in the substituents $X^1$, $X^2$, $R^1$, $R^2$, $R^3$, $R^4$, $R^5$ and $R^6$ is a silyl group substituted with a hydrocarbon group, and examples of the hydrocarbon group include an alkyl group having 1–10 carbon atoms such as methyl group, ethyl group, n-propyl group, isopropyl group, n-butyl group, sec-butyl group, tert-butyl group, isobutyl group, n-pentyl group, n-hexyl group, cyclohexyl group, etc.; and an aryl group (such as phenyl group), etc. Examples of the substituted silyl group having 1–20 carbon atoms include a monosubstituted silyl group having 1–20 carbon atoms such as amethylsilyl group, ethylsilyl group, phenylsilyl group, etc.; a disubsituted silyl group having 2–20 carbon atoms such as dimethylsilyl group, diethylsilyl group, diphenylsilyl group, etc.; and a trisubstituted silyl group having 3–20 carbon atoms such as trimethylsilyl group, triethylsilyl group, tri-n-propylsilyl group, triisopropylsilyl group, tri-n-butylsilyl group, tri-sec-butylsilyl group, tri-tert-butylsilyl group, tri-isobutylsilyl group, tert-butyl-dimethylsilyl group, tri-n-pentylsilyl group, tri-n-hexylsilyl group, tricyclohexylsilyl group, triphenylsilyl group, etc., and preferably a trimethylsilyl group, tert-butyldimethylsilyl group or triphenylsilyl group.

The hydrocarbon group of these substituted silyl groups may be substituted with a halogen atom such as a fluorine atom, chlorine atom, bromine atom, iodine atom and the like; and/or an alkoxy group such as methoxy, ethoxy, aryloxy group (such as phenoxy), or aralkyloxy group (such as benzyloxy), and the like.

With respect to the alkoxy group in the substituents $X^1$, $X^2$, $R^1$, $R^2$, $R^3$, $R^4$, $R^5$ and $R^6$, an alkoxy group having 1–20 carbon atoms is preferable. Examples of such alkoxy groups include a methoxy group, ethoxy group, n-propoxy group, isopropoxy group, n-butoxy group, sec-butoxy group, t-butoxy group, n-pentoxy group, neopentoxy group, n-hexoxy group, n-octoxy group, n-dodexoxy group, n-pentadecoxy group, n-icosoxy group, etc., and preferably a methoxy group, ethoxy group or t-butoxy group.

These alkoxy groups may be partially substituted with a halogen atom such as a fluorine atom, chlorine atom, bromine atom, iodine atom and the like; an alkoxy group such as methoxy, ethoxy, aryloxy group (such as phenoxy), or aralkyloxy group (such as benzyloxy), and the like.

With respect to the aralkyloxy group in the substituents $X^1$, $X^2$, $R^1$, $R^2$, $R^3$, $R^4$, $R^5$ and $R^6$, an aralkyloxy group having 7–20 carbon atoms is preferable. Examples of the aralkyloxy group include a benzyloxy group, (2-methylphenyl)methoxy group, (3-methylphenyl) methoxy group, (4-methylphenyl) methoxy group, (2,3-dimethylphenyl) methoxy group, (2,4-dimethylphenyl) methoxy group, (2,5-dimethylphenyl) methoxy group, (2,6-dimethylphenyl) methoxy group, (3,4-dimethylphenyl) methoxy group, (3,5-dimethylphenyl) methoxy group, (2,3,4-trimethylphenyl) methoxy group, (2,3,5-trimethylphenyl) methoxy group, (2,3,6-trimethylphenyl) methoxy group, (2,4,5-trimethylphenyl) methoxy group, (2,4,6-trimethylphenyl) methoxy group, (3,4,5-trimethylphenyl) methoxy group, (2,3,4,5-tetramethylphenyl) methoxy group, (2,3,4,6-tetramethylphenyl) methoxy group, (2,3,5,6)-tetramethylphenyl) methoxy group, (pentamethylphenyl) methoxy group, (ethylphenyl) methoxy group, (n-propylphenyl) methoxy group, (isopropylphenyl) methoxy group, (n-butylphenyl) methoxy group, (sec-butylphenyl) methoxy group, (tert-butylphenyl) methoxy group, (n-hexylphenyl) methoxy group, (n-octylphenyl) methoxy group, (n-decylphenyl) methoxy group, (n-tetradecylphenyl) methoxy group, naphthylmethoxy group, anthracenylmethoxy group, etc., and preferably a benzyloxy group.

These aralkyloxy groups may be partially substituted with a halogen atom such as fluorine atom, chlorine atom, bromine atom, iodine atom and the like; an alkoxy group such as methoxy, ethoxy, aryloxy group (such as phenoxy), an aralkyloxy group (such as benzyloxy), and the like.

Examples of the aryloxy group in the substituents $X^1$, $X^2$, $R^1$, $R^2$, $R^3$, $R^4$, $R^5$ and $R^6$ include an aryloxy group having 6–20 carbon atoms such as a phenoxy group, 2-methylphenoxy group, 3-methylphenoxy group, 4-methylphenoxy group, 2,3-dimethylphenoxy group, 2,4-dimethylphenoxy group, 2,5-dimethylphenoxy group, 2,6-dimethylphenoxy group, 3,4-dimethylphenoxy group, 3,5-dimethylphenoxy group, 2,3,4-trimethylphenoxy group, 2,3,5-trimethylphenoxy group, 2,3,6-trimethylphenoxy group, 2,4,5-trimethylphenoxy group, 2,4,6-trimethylphenoxy group, 3,4,5-trimethylphenoxy group, 2,3,4,5-tetramethylphenoxy group, 2,3,4,6-tetramethylphenoxy group, 2,3,5,6-tetramethylphenoxy group, pentamethylphenyl group, ethylphenoxy group, n-propylphenoxy group, isopropylphenoxy group, n-butylphenoxy group, sec-butylphenoxy group, tert-butylphenoxy group, n-hexylphenoxy group, n-octylphenoxy group, n-decylphenoxy group, n-tetradecylphenoxy group, naphthoxy group, anthracenoxy group and the like.

These aryloxy groups may be partially substituted with a halogen atom such as a fluorine atom, chlorine atom, bromine atom, iodine atom and the like, an alkoxy group such as methoxy, ethoxy, aryloxy group (such as phenoxy), or an aralkyloxy group (such as benzyloxy), and the like.

The disubstituted amino group in the substituents $X^1$, $X^2$, $R^1$, $R^2$, $R^3$, $R^4$, $R^5$ and $R^6$ is an amino group substituted with two hydrocarbon groups. Examples of the hydrocarbon group include an alkyl group having 1–10 carbon atoms such as a methyl group, ethyl group, n-propyl group, isopropyl group, n-butyl group, sec-butyl group, tert-butyl group, isobutyl group, n-pentyl group, n-hexyl group, cyclohexyl group, etc.; an aryl group having 6–10 carbon atoms (such as phenyl group); an aralkyl group having 7–10 carbon atoms etc. Examples of the amino group disubstituted with hydrocarbon groups having 1–10 carbon atoms include a dimethylamino group, diethylamino group, di-n-propylamino group, diisopropylamino group, di-n-butylamino group, di-sec-butylamino group, di-tert-butylamino group, di-isobutylamino group, tert-butylisopropylamino group, di-n-hexylamino group, di-n-octylamino group, di-n-decylamino group, diphenylamino group, bistrimethylsilylamino group, bis-tert-butyldimethylsilylamino group, etc., and preferably a dimethylamino group or diethylamino group.

These disubstituted amino groups may be substituted partly with a halogen atom such as a fluorine atom, chlorine atom, bromine atom, iodine atom and the like; an alkoxy group such as methoxy group, ethoxy group and the like; an aryloxy group (such as phonoxy group) and the like; or an aralkyloxy group (such as benzyloxy group) and the like.

The substituents $R^1$, $R^2$, $R^3$, $R^4$, $R^5$ and $R^6$ may be optionally combined to form a ring.

$R^1$ is preferably an alkyl group, an aralkyl group, an aryl group, or a substituted silyl group.

$X^1$ and $X^2$ independently and preferably represent a halogen atom, an alkyl group, an aralkyl group, an alkoxy group, an aryloxy group, or a disubstituted amino group, more preferably a halogen atom or an alkoxy group.

Examples of the atom of group XVI in the Periodic Table include an oxygen atom, sulfur atom, selenium atom, and preferably oxygen atom.

Examples of the transition metal complex represented by the general formula [I] include: methylene (cyclopentadienyl)(3,5-dimethyl-2-phenoxy)titanium dichloride, methylene(cyclopentadienyl)(3-tert-butyl-2-phenoxy)titanium dichloride, methylene(cyclopentadienyl)(3-tert-butyl-5-methyl-2-phenoxy)titanium dichloride, methylene(cyclopentadienyl)(3-phenyl-2-phenoxy)titanium dichloride, methylene(cyclopentadienyl)(3-tert-butyldimethylsilyl-5-methyl-2-phenoxy)titanium dichloride, methylene(cyclopentadienyl)(3-trimethylsilyl-5-methyl-2-phenoxy)titanium dichloride, methylene (cyclopentadienyl)(3-tert-butyl-5-methoxy-2-phenoxy) titanium dichloride, methylene(cyclopentadienyl)(3-tert-butyl-5-chloro-2-phenoxy)titanium dichloride, methylene (methylcyclopentadienyl)(3,5-dimethyl-2-phenoxy) titanium dichloride, methylene(methylcyclopentadienyl)(3-tert-butyl-2-phenoxy)titanium dichloride, methylene (methylcyclopentadienyl)(3-tert-butyl-5-methyl-2-phenoxy)titanium-dichloride, methylene (methylcyclopentadienyl)(3-phenyl-2-phenoxy)titanium dichloride, methylene(methylcyclopentadienyl)(3-tert-butyldimethylsilyl-5-methyl-2-phenoxy)titanium dichloride, methylene(methylcyclopentadienyl)(3-trimethylsilyl-5-methyl-2-phenoxy)titanium dichloride, methylene(methylcyclopentadienyl)(3-tert-butyl-5-methoxy-2-phenoxy)titanium dichloride, methylene (methylcyclopentadienyl)(3-tert-butyl-5-chloro-2-phenoxy)

titanium dichloride, methylene(tert-butylcyclopentadienyl)(3,5-dimethyl-2-phenoxy)titanium dichloride, methylene(tert-butylcyclopentadienyl)(3-tert-butyl-2-phenoxy)titanium dichloride, methylene(tert-butylcyclopentadienyl)(3-tert-butyl-5-methyl-2-phenoxy)titanium dichloride, methylene(tert-butylcyclopentadienyl)(3-phenyl-2-phenoxy)titanium dichloride, methylene(tert-butylcyclopentadienyl)(3-tert-butyldimethylsilyl-5-methyl-2-phenoxy)titanium dichloride, methylene(tert-butylcyclopentadienyl)(3-trimethylsilyl-5-methyl-2-phenoxy)titanium dichloride, methylene(tert-butylcyclopentadienyl)(3-tert-butyl-5-methoxy-2-phenoxy)titanium dichloride, methylene(tert-butylcyclopentadienyl)(3-tert-butyl-5-chloro-2-phenoxy)titanium dichloride, methylene(tetramethylcyclopentadienyl)(3,5-dimethyl-2-phenoxy)titanium dichloride, methylene(tetramethylcyclopentadienyl)(3-tert-butyl- 2-phenoxy)titanium dichloride, methylene(tetramethylcyclopentadienyl)(3-tert-butyl-5-methyl-2-phenoxy)titanium dichloride, methylene(tetramethylcyclopentadienyl)(3-phenyl-2-phenoxy)titanium dichloride, methylene(tetramethylcyclopentadienyl)(3-tert-butyldimethylsilyl-5-methyl-2-phenoxy)titanium dichloride, methylene(tetramethylcyclopentadienyl)(3-trimethylsilyl-5-methyl-2-phenoxy)titanium dichloride, methylene(tetramethylcyclopentadienyl)(3-tert-butyl-5-methoxy-2-phenoxy)titanium dichloride, methylene(tetramethylcyclopentadienyl)(3-tert-butyl-5-chloro-2-phenoxy)titanium dichloride, methylene(trimethylsilylcyclopentadienyl)(3,5-dimethyl-2-phenoxy)titanium dichloride, methylene(trimethylsilylcyclopentadienyl)(3-tert-butyl-2-phenoxy)titanium dichloride, methylene(trimethylsilylcyclopentadienyl)(3-tert-butyl-5-methyl-2-phenoxy)titanium dichloride, methylene(trimethylsilylcyclopentadienyl)(3-phenyl-2-phenoxy)titanium dichloride, methylene(trimethylsilylcyclopentadienyl)(3-tert-hutyldimethylsilyl-5-methyl-2-phenoxy)titanium dichloride, methylene(trimethylsilylcyclopentadienyl)( 3-trimethylsilyl-5-methyl-2-phenoxy)titanium dichloride, methylene(trimethylsilylcyclopentadienyl)(3-tert-butyl-5-methoxy-2-phenoxy)titanium dichloride, methylene(trimethylsilylcyclopentadienyl)(3-tert-butyl-5-chloro-2-phenoxy)titanium dichloride, methylene(fluorenyl)(3,5-dimethyl-2-phenoxy)titanium dichloride, methylene(fluorenyl)(3-tert-butyl-2-phenoxy)titanium dichloride, methylene(fluorenyl)(3-tert-butyl-5-methyl-2-phenoxy)titanium dichloride, methylene(fluorenyl)(3-phenyl-2-phenoxy)titanium dichloride, methylene(fluorenyl)(3-tert-butyldimethylsilyl-5-methyl-2-phenoxy)titanium dichloride, methylene(fluorenyl)(3-trimethylsilyl-5-methyl-2-phenoxy)titanium dichloride, methylene(fluorenyl)(3-tert-butyl-5-methoxy-2-phenoxy)titanium dichloride, methylene(fluorenyl)(3-tert-butyl-5-chloro-2-phenoxy)titanium dichloride, isopropylidene(cyclopentadienyl)(3,5-dimethyl-2-phenoxy)titanium dichloride, isopropylidene(cyclopentadienyl)(3-tert-butyl-2-phenoxy)titanium dichloride, isopropylidene(cyclopentadienyl)(3-tert-butyl-5-methyl-2-phenoxy)titanium dichloride, isopropylidene(cyclopentadienyl)(3-phenyl-2-phenoxy)titanium dichloride, isopropylidene(cyclopentadienyl)(3-tert-butyldimethylsilyl-5-methyl-2-phenoxy)titanium dichloride, isopropylidene(cyclopentadienyl)(3-trimethylsilyl-5-methyl-2-phenoxy)titanium dichloride, isopropylidene(cyclopentadienyl)(3-tert-butyl-5-methoxy-2-phenoxy)titanium dichloride, isopropylidene(cyclopentadienyl)(3-tert-butyl-5-chloro-2-phenoxy)titanium dichloride, isopropylidene(methylcyclopentadienyl)(3,5-dimethyl-2-phenoxy)titanium dichloride, isopropylidene(methylcyclopentadienyl)(3-tert-butyl-2-phenoxy)titanium dichloride, isopropylidene(methylcyclopentadienyl)(3-tert-butyl-5-methyl-2-phenoxy)titanium dichloride, isopropylidene(methylcyclopentadienyl)(3-phenyl-2-phenoxy)titanium dichloride, isopropylidene(methylcyclopentadienyl)(3-tert-butyldimethylsilyl-5-methyl-2-phenoxy)titanium dichloride, isopropylidene(methylcyclopentadienyl)(3-trimethylsilyl-5-methyl-2-phenoxy)titanium dichloride, isopropylidene(methylcyclopentadienyl)(3-tert-butyl-5-methoxy-2-phenoxy)titanium dichloride, isopropylidene(methylcyclopentadienyl)(3-tert-butyl-5-chloro-2-phenoxy)titanium dichloride, isopropylidene(tert-butylcyclopentadienyl)( 3,5-dimethyl-2-phenoxy)titanium dichloride, isopropylidene(tert-butylcyclopentadienyl)(3-tert-butyl-2-phenoxy)titanium dichloride, isopropylidene(tert-butylcyclopentadienyl)(3-tert-butyl-5-methyl-2-phenoxy)titanium dichloride, isopropylidene(tert-butylcyclopentadienyl)(3-phenyl-2-phenoxy)titanium dichloride, isopropylidene(tert-butylcyclopentadienyl)(3-tert-butyldimethylsilyl-5-methyl-2-phenoxy)titanium dichloride, isopropylidene(tert-butylcyclopentadienyl)(3-trimethylsilyl-5-methyl-2-phenoxy)titanium dichloride, isopropylidene(tert-butylcyclopentadienyl)(3-tert-butyl-5-methoxy-2-phenoxy)titanium dichloride, isopropylidene(tert-butylcyclopentadienyl)(3-tert-butyl-5-chloro-2-phenoxy)titanium dichloride, isopropylidene(tetramethylcyclopentadienyl)(3,5-dimethyl-2-phenoxy)titanium dichloride, isopropylidene(tetramethylcyclopentadienyl)(3-tert-butyl-2-phenoxy)titanium dichloride, isopropylidene(tetramethylcyclopentadienyl)(3-tert-butyl-5-methyl-2-phenoxy)titanium dichloride, isopropylidene(tetramethylcyclopentadienyl)(3-phenyl-2-phenoxy)titanium dichloride, isopropylidene(tetramethylcyclopentadienyl)(3-tert-butyldimethylsilyl-5-methyl-2-phenoxy)titanium dichloride, isopropylidene(tetramethylcyclopentadienyl)(3-trimethylsilyl-5-methyl-2-phenoxy)titanium dichloride, isopropylidene(tetramethylcyclopentadienyl)(3-tert-butyl-5-methoxy-2-phenoxy)titanium dichloride, isopropylidene(tetramethylcyclopentadienyl)(3-tert-butyl-5-chloro-2-phenoxy)titanium dichloride, isopropylidene(trimethylsilylcyclopentadienyl)(3,5-dimethyl-2-phenoxy)titanium dichloride, isopropylidene(trimethylsilylcyclopentadienyl)(3-tert-butyl-2-phenoxy)titanium dichloride, isopropylidene(trimethylsilylcyclopentadienyl)(3-tert-butyl-5-methyl-2-phenoxy)titanium dichloride, isopropylidene(trimethylsilylcyclopentadienyl)(3-phenyl-2-phenoxy)titanium dichloride, isopropylidene(trimethylsilylcyclopentadienyl)(3-tert-butyldimethylsilyl-5-methyl-2-phenoxy)titanium dichloride, isopropylidene(trimethylsilylcyclopentadienyl)(3-trimethylsilyl-5-methyl-2-phenoxy)titanium dichloride, isopropylidene(trimethylsilylcyclopentadienyl)(3-tert-butyl-5-methoxy-2-phenoxy)titanium dichloride, isopropylidene(trimethylsilylcyclopentadienyl)(3-tert-butyl-5-chloro-2-phenoxy)titanium dichloride, isopropylidene(fluorenyl)(3,5-dimethyl- 2-phenoxy)titanium dichloride, isopropylidene(fluorenyl)(3-tert-butyl-2-phenoxy)titanium dichloride, isopropylidene(fluorenyl)(3-tert-butyl-5-methyl-2- phenoxy)titanium dichloride, isopropylidene(fluorenyl)(3-phenyl-2-phenoxy)titanium dichloride, isopropylidene (fluorenyl)(3-tert-butyldimethylsilyl-5-methyl-2-phenoxy) titanium dichloride, isopropylidene(fluorenyl)(3-trimethylsilyl-5-methyl-2-phenoxy)titanium dichloride, isopropylidene(fluorenyl)(3-tert-butyl-5-methoxy-2-phenoxy)titanium dichloride, isopropylidene(fluorenyl)(3-tert-butyl-5-chloro-2-phenoxy)titanium dichloride, diphenylmethylene(cyclopentadienyl)(3,5-dimethyl-2-phenoxy)titanium dichloride, diphenylmethylene (cyclopentadienyl)(3-tert-butyl-2-phenoxy)titanium dichloride, diphenylmethylene (cyclopentadienyl)(3-tert-butyl-5-methyl-2-phenoxy)titanium dichloride, diphenylmethylene (cyclopentadienyl)(3-phenyl-2-phenoxy)titanium dichloride, diphenylmethylene (cyclopentadienyl)(3-tert-butyldimethylsilyl-5-methyl-2-phenoxy)titanium dichloride, diphenylmethylene (cyclopentadienyl)(3-trimethylsilyl-5-methyl-2-phenoxy)titanium dichloride, diphenylmethylene (cyclopentadienyl)(3-tert-butyl-5-methoxy-2-phenoxy)titanium dichloride, diphenylmethylene (cyclopentadienyl)(3-tert-butyl-5-chloro-2-phenoxy) titanium dichloride, diphenylmethylene (methylcyclopentadienyl)(3,5-dimethyl-2-phenoxy) titanium dichloride, diphenylmethylene (methylcyclopentadienyl)(3-tert-butyl-2-phenoxy)titanium dichloride, diphenylmethylene (methylcyclopentadienyl) (3-tert-butyl-5-methyl-2-phenoxy)titanium dichloride, diphenylmethylene (methylcyclopentadienyl) (3-phenyl-2-phenoxy)titanium dichloride, diphenylmethylene (methylcyclopentadienyl) (3-tert-butyldimethylsilyl-5-methyl-2-phenoxy)titanium dichloride, diphenylmethylene (methylcyclopentadienyl) (3-trimethylsilyl-5-methyl-2-phenoxy)titanium dichloride, diphenylmethylene (methylcyclopentadienyl) (3-tert-butyl-5-methoxy-2-phenoxy)titanium dichloride, diphenylmethylene (methylcyclopentadienyl) (3-tert-butyl-5-chloro-2-phenoxy)titanium dichloride, diphenylmethylene (tert-butylcyclopentadienyl) (3,5-dimethyl-2-phenoxy)titanium dichloride, diphenylmethylene (tert-butylcyclopentadienyl) (3-tert-butyl-2-phenoxy)titanium dichloride, diphenylmethylene (tert-butylcyclopentadienyl) (3-tert-butyl-5-methyl-2-phenoxy)titanium dichloride, diphenylmethylene (tert-butylcyclopentadienyl) (3-phenyl-2-phenoxy)titanium dichloride, diphenylmethylene (tert-butylcyclopentadienyl) (3-tert-butyldimethylsilyl-5-methyl-2-phenoxy)titanium dichloride, diphenylmethylene (tert-butylcyclopentadienyl) (3-trimethylsilyl-5-methyl-2-phenoxy)titanium dichloride, diphenylmethylene (tert-butylcyclopentadienyl) (3-tert-butyl-5-methoxy-2-phenoxy)titanium dichloride, diphenylmethylene (tert-butylcyclopentadienyl) (3-tert-butyl-5-chloro-2-phenoxy)titanium dichloride, diphenylmethylene (tetramethylcyclopentadienyl) (3,5-dimethyl-2-phenoxy) titanium dichloride, diphenylmethylene (tetramethylcyclopentadienyl) (3-tert-butyl-2-phenoxy) titanium dichloride, diphenylmethylene (tetramethylcyclopentadienyl) (3-tert-butyl-5-methyl-2-phenoxy)titanium dichloride, diphenylmethylene (tetramethylcyclopentadienyl) (3-phenyl-2-phenoxy) titanium dichloride, diphenylmethylene (tetramethylcyclopentadienyl) (3-tert-butyldimethylsilyl-5-methyl-2-phenoxy)titanium dichloride, diphenylmethylene (tetramethylcyclopentadienyl) (3-trimethylsilyl-5-methyl-2-phenoxy)titanium dichloride, diphenylmethylene (tetramethylcyclopentadienyl) (3-tert-butyl-5-methoxy-2-phenoxy)titanium dichloride, diphenylmethylene (tetramethylcyclopentadienyl) (3-tert-butyl-5-chloro-2-phenoxy)titanium dichloride, diphenylmethylene (trimethylsilylcyclopentadienyl) (3,5-dimethyl-2-phenoxy) titanium dichloride, diphenylmethylene (trimethylsilylcyclopentadienyl) (3-tert-butyl-2-phenoxy) titanium dichloride, diphenylmethylene (trimethylsilylcyclopentadienyl) (3-tert-butyl-5-methyl-2-phenoxy)titanium dichloride, diphenylmethylene (trimethylsilylcyclopentadienyl) (3-phenyl-2-phenoxy) titanium dichloride, diphenylmethylene (trimethylsilylcyclopentadienyl) (3-tert-butyldimethylsilyl-5-methyl-2-phenoxy)titanium dichloride, diphenylmethylene (trimethylsilylcyclopentadienyl) (3-trimethylsilyl-5-methyl-2-phenoxy)titanium dichloride, diphenylmethylene (trimethylsilylcyclopentadienyl) (3-tert-butyl-5-methoxy-2-phenoxy) titanium dichloride, diphenylmethylene (trimethylsilylcyclopentadienyl) (3-tert-butyl-5-chloro-2-phenoxy)titanium dichloride, diphenylmethylene (fluorenyl) (3,5-dimethyl-2-phenoxy)titanium dichloride, diphenylmethylene (fluorenyl) (3-tert-butyl-2-phenoxy)titanium dichloride, diphenylmethylene (fluorenyl) (3-tert-butyl-5-methyl-2-phenoxy)titanium dichloride, diphenylmethylene (fluorenyl) (3-phenyl-2-phenoxy)titanium dichloride, diphenylmethylene (fluorenyl) (3-tert-butyldimethylsilyl-5-methyl-2-phenoxy)titanium dichloride, diphenylmethylene (fluorenyl) (3-trimethylsilyl-5-methyl-2-phenoxy)titanium dichloride, diphenylmethylene (fluorenyl) (3-tert-butyl-5-methoxy-2-phenoxy)titanium dichloride, diphenylmethylene (fluorenyl) (3-tert-butyl-5-chloro-2-phenoxy)titanium dichloride, etc., transition metal complexes wherein J in the chemical formula [I] is a carbon atom, such as compounds wherein titanium of these compounds is replaced by zirconium or hafnium, compounds wherein the dichloride of these compounds is replaced by dibromide, diiodide, bis (dimethylamide), bis(diethylamide), di-n-butoxide or diisopropoxide, compounds wherein cyclopentadienyl of these compounds is replaced by dimethylcyclopentadienyl, trimethylcyclopentadienyl, n-butylcyclopentadienyl, tert-butyldimethylsilylcyclopentadienyl or indenyl, and compounds wherein 3,5-dimethyl-2-phenoxy of these compounds is replaced by 2-phenoxy, 3-methyl-2-phenoxy, 3,5-di-tert-butyl-2-phenoxy, 3-phenyl-5-methyl-2-phenoxy, 3-tert-butyldimethylsilyl-2-phenoxy or 3-trimethylsilyl-2-phenoxy; and dimethylsilyl(cyclopentadienyl)(2-phenoxy) titanium dichloride, dimethylsilyl(cyclopentadienyl)(3-methyl-2-phenoxy)titanium dichloride, dimethylsilyl (cyclopentadienyl)(3,5-dimethyl-2-phenoxy)titanium dichloride, dimethylsilyl(cyclopentadienyl)(3-tert-butyl-2-phenoxy)titanium dichloride, dimethylsilyl (cyclopentadienyl)(3-tert-butyl-5-methyl-2-phenoxy) titanium dichloride, dimethylsilyl(cyclopentadienyl)(3,5-di-tert-butyl-2-phenoxy)titanium dichloride, dimethylsilyl (cyclopentadienyl)(5-methyl-3-phenyl-2-phenoxy)titanium dichloride, dimethylsilyl(cyclopentadienyl)(3-tert-butyldimethylsilyl-5-methyl-2-phenoxy)titanium dichloride, dimethylsilyl(cyclopentadienyl)(5-methyl-3-trimethylsilyl-2-phenoxy)titanium dichloride, dimethylsilyl (cyclopentadienyl)(3-tert-butyl-5-methoxy-2-phenoxy) titanium dichloride, dimethylsilyl(cyclopentadienyl)(3-tert-butyl-5-chloro-2-phenoxy)titanium dichloride, dimethylsilyl(cyclopentadienyl)(3,5-diamyl-2-phenoxy) titanium dichloride, dimethylsilyl(methylcyclopentadienyl) (2-phenoxy)titanium dichioride, dimethylsilyl (methylcyclopentadienyl)(3-methyl-2-phenoxy)titanium dichloride, dimethylsilyl(methylcyclopentadienyl)(3,5-dimethyl- 2-phenoxy)titanium dichloride, dimethylsilyl (methylcyclopentadienyl)(3-tert-butyl-2-phenoxy)titanium dichloride, dimethylsilyl(methylcyclopentadienyl)(3-tert-butyl-5-methyl-2-phenoxy)titanium dichloride, dimethylsilyl(methylcyclopentadienyl)(3,5-di-tert-butyl-2-phenoxy)titanium dichloride, dimethylsilyl(methylcyclopentadienyl)(5-methyl-3-phenyl-2-phenoxy)titanium dichloride, dimethylsilyl(methylcyclopentadienyl)(3-tert-butyldimethylsilyl-5-methyl-2-phenoxy)titanium dichloride, dimethylsilyl(methylcyclopentadienyl)(5-methyl-3-trimethylsilyl-2-phenoxy)titanium dichloride, dimethylsilyl(methylcyclopentadienyl)(3-tert-butyl-5-methoxy-2-phenoxy)titanium dichloride, dimethylsilyl(methylcyclopentadienyl)(3-tert-butyl-5-chloro-2-phenoxy)titanium dichloride, dimethylsilyl(methylcyclopentadienyl)(3,5-diamyl-2-phenoxy)titanium dichloride, dimethylsilyl(n-butylcyclopentadienyl)(2-phenoxy)titanium dichloride, dimethylsilyl(n-butylcyclopentadienyl)(3-methyl-2-phenoxy)titanium dichloride, dimethylsilyl(n-butylcyclopentadienyl)(3,5-dimethyl-2-phenoxy)titanium dichloride, dimethylsilyl(n-butylcyclopentadienyl)(3-tert-butyl-2-phenoxy)titanium dichloride, dimethylsilyl(n-butylcyclopentadienyl)(3-tert-butyl-5-methyl-2-phenoxy)titanium dichloride, dimethylsilyl(n-butylcyclopentadienyl)(3,5-di-tert-butyl-2-phenoxy)titanium dichloride, dimethylsilyl(n-butylcyclopentadienyl)(5-methyl-3-phenyl-2-phenoxy)titanium dichloride, dimethylsilyl(n-butylcyclopentadienyl)(3-tert-butyldimethylsilyl-5-methyl-2-phenoxy)titanium dichloride, dimethylsilyl(n-butylcyclopentadienyl)(5-methyl-3-trimethylsilyl-2-phenoxy)titanium dichloride, dimethylsilyl(n-butylcyclopentadienyl)(3-tert-butyl-5-methoxy-2-phenoxy)titanium dichloride, dimethylsilyl(n-butylcyclopentadienyl)(3-tert-butyl-5-chloro-2-phenoxy)titanium dichloride, dimethylsilyl(n-butylcyclopentadienyl)(3,5-diamyl-2-phenoxy)titanium dichloride, dimethylsilyl(tert-butylcyclopentadienyl)(2-phenoxy)titanium dichloride, dimethylsilyl(tert-butylcyclopentadienyl)(3-methyl-2-phenoxy)titanium dichloride, dimethylsilyl(tert-butylcyclopentadienyl)(3,5-dimethyl-2-phenoxy)titanium dichloride, dimethylsilyl(tert-butylcyclopentadienyl)(3-tert-butyl-2-phenoxy)titanium dichloride, dimethylsilyl(tert-butylcyclopentadienyl)(3-tert-butyl-5-methyl- 2-phenoxy)titanium dichloride, dimethylsilyl(tert-butylcyclopentadienyl)(3,5-di-tert-butyl-2-phenoxy)titanium dichloride, dimethylsilyl(tert-butylcyclopentadienyl)(5-methyl-3-phenyl-2-phenoxy)titanium dichloride, dimethylsilyl(tert-butylcyclopentadienyl)(3-tert-butyldimethylsilyl-5-methyl-2-phenoxy)titanium dichloride, dimethylsilyl(tert-butylcyclopentadienyl)(5-methyl-3-trimethylsilyl-2-phenoxy)titanium dichloride, dimethylsilyl(tert-butylcyclopentadienyl)(3-tert-butyl-5-methoxy-2-phenoxy)titanium dichloride, dimethylsilyl(tert-butylcyclopentadienyl)(3-tert-butyl-5-chloro-2-phenoxy)titanium dichloride, dimethylsilyl(tert-butylcyclopentadienyl)(3,5-diamyl-2-phenoxy)titanium dichloride, dimethylsilyl(tetramethylcyclopentadienyl)(2-phenoxy)titanium dichloride, dimethylsilyl(tetramethylcyclopentadienyl)(3-methyl-2-phenoxy)titanium dichloride, dimethylsilyl(tetramethylcyclopentadienyl)(3,5-dimethyl-2-phenoxy)titanium dichloride, dimethylsilyl(tetramethylcyclopentadienyl)(3-tert-butyl-2-phenoxy)titanium dichloride, dimethylsilyl(tetramethylcyclopentadienyl)(3-tert-butyl-5-methyl-2-phenoxy)titanium dichloride, dimethylsilyl(tetramethylcyclopentadienyl)(3,5-di-tert-butyl-2-phenoxy)titanium dichloride, dimethylsilyl(tetramethylcyclopentadienyl)(5-methyl-3-phenyl-2-phenoxy)titanium dichloride, dimethylsilyl(tetramethylcyclopentadienyl)(3-tert-butyldimethylsilyl-5-methyl-2-phenoxy)titanium dichloride, dimethylsilyl(tetramethylcyclopentadienyl)(5-methyl-3-trimethylsilyl-2-phenoxy)titanium dichloride, dimethylsilyl(tetramethylcyclopentadienyl)(3-tert-butyl-5-methoxy-2-phenoxy)titanium dichloride, dimethylsilyl(tetramethylcyclopentadienyl)(3-tert-butyl-5-chloro-2-phenoxy)titanium dichloride, dimethylsilyl(tetramethylcyclopentadienyl)(3,5-diamyl-2-phenoxy)titanium dichloride, dimethylsilyl(trimethylsilylcyclopentadienyl)(2-phenoxy)titanium dichloride, dimethylsilyl(trimethylsilylcyclopentadienyl)(3-methyl-2-phenoxy)titanium dichloride, dimethylsilyl(trimethylsilylcyclopentadienyl)(3,5-dimethyl-2-phenoxy)titanium dichloride, dimethylsilyl(trimethylsilylcyclopentadienyl)(3-tert-butyl-2-phenoxy)titanium dichloride, dimethylsilyl(trimethylsilylcyclopentadienyl)(3-tert-butyl-5-methyl-2-phenoxy)titanium dichloride, dimethylsilyl(trimethylsilylcyclopentadienyl)( 3,5-di-tert-butyl-2-phenoxy)titanium dichloride, dimethylsilyl(trimethylcyclopentadienyl)(5-methyl-3-phenyl-2-phenoxy)titanium dichloride, dimethylsilyl(trimethylsilylcyclopentadienyl)(3-tert-butyldimethylsilyl-5-methyl-2-phenoxy)titanium dichloride, dimethylsilyl(trimethylsilylcyclopentadienyl)(5-methyl-3-trimethylsilyl-2-phenoxy)titanium dichloride, dimethylsilyl(trimethylsilylcyclopentadienyl)(3-tert-butyl-5-methoxy-2-phenoxy)titanium dichloride, dimethylsilyl(trimethylsilylcyclopentadienyl)(3-tert-butyl-5-chloro-2-phenoxy)titanium dichloride, dimethylsilyl(trimethylsilylcyclopentadienyl)(3,5-diamyl-2-phenoxy)titanium dichloride, dimethylsilyl(indenyl)(2-phenoxy)titanium dichloride, dimethylsilyl(indenyl)(3-methyl-2-phenoxy)titanium dichloride, dimethylsilyl(indenyl)(3,5-dimethyl-2-phenoxy)titanium dichloride, dimethylsilyl(indenyl)(3-tert-butyl-2-phenoxy)titanium dichloride, dimethylsilyl(indenyl)(3-tert-butyl-5-methyl-2-phenoxy)titanium dichloride, dimethylsilyl(indenyl)(3,5-di-tert-butyl-2-phenoxy)titanium dichloride, dimethylsilyl(indenyl)(5-methyl-3-phenyl-2-phenoxy) titanium dichloride, dimethylsilyl(indenyl)(3-tert-butyldimethylsilyl- 5-methyl-2-phenoxy)titanium dichloride, dimethylsilyl(indenyl)(5-methyl-3-trimethylsilyl-2-phenoxy)titanium dichloride, dimethylsilyl(indenyl)(3-tert-butyl-5-methoxy-2-phenoxy) titanium dichloride, diinethylsilyl(indenyl)(3-tert-butyl-5-chloro-2-phenoxy)titanium dichloride, dimethylsilyl(indenyl)(3,5-diamyl-2-phenoxy)titanium dichloride, dimethylsilyl(fluorenyl)(2-phenoxy)titanium dichloride, dimethylsilyl(fluorenyl)(3-methyl-2-phenoxy)titanium dichloride, dimethylsilyl(fluorenyl)(3,5-dimethyl-2-phenoxy)titanium dichloride, dimethylsilyl(fluorenyl)(3-tert-butyl-2-phenoxy)titanium dichloride, dimethylsilyl(fluorenyl)(3-tert-butyl-5-methyl-2-phenoxy)titanium dichloride, dimethylsilyl(fluorenyl)(3,5-di-tert-butyl-2-phenoxy)titanium dichloride, dimethylsilyl(fluorenyl)(5-methyl-3-phenyl-2-phenoxy)titanium dichloride, dimethylsilyl(fluorenyl)(3-tert-butyldimethylsilyl-5-methyl-2-phenoxy)titanium dichloride, dimethylsilyl(fluorenyl)(5-methyl-3-trimethylsilyl-2-phenoxy)titanium dichloride, dimethylsilyl(fluorenyl)(3-tert-butyl-5-methoxy-2-phenoxy)titanium dichloride, dimethylsilyl(fluorenyl)(3-tert-butyl-5-chloro-2-phenoxy)titanium dichloride, dimethylsilyl(fluorenyl)(3,5-diamyl-2-phenoxy)titanium dichloride, dimethylsilyl(tetramethyl cyclopentadienyl)(1-naphthoxy-2-il)titanium dichloride, etc., the compounds wherein the (cyclopentadienyl) of these compounds have-been changed to (dimethylcyclopentadienyl), (trimethylcyclopentadienyl), (ethylcyclopentadienyl), (n-propylcyclopentadienyl), (isopropylcyclopentadienyl), (sec-butylcyclopentadienyl), (isobutylcyclopentadienyl), (tert-butyldimethylsilyl cyclopentadienyl), (phenylcyclopentadienyl), (methylindenyl), or (phenylindenyl); the compounds wherein (2-phenoxy) has been changed to (3-phenyl 2-phenoxy), (3-trimethyl silyl-2-phenoxy), or (3-tert-butyl dimethylsilyl-2-phenoxy); the compounds wherein dimethyl silyl has been changed to diethyl silyl, diphenyl silyl, or dimethoxy silyl; the compounds wherein titanium has been changed to zirconium or hafnium; the compounds wherein dichloride has been changed to dibromide, diiodide, bis(dimethylamide), bis (diethylamide), di-n-buthoxide, or diisopropoxide, which are transition metal complexes wherein J in the chemical formula [I] is an atom of the group XIV in the Periodic Table of the elements other than the carbon atoms.

Examples of the transition metal complex represented by the general formula [II] include: μ-oxo bis{isopropylidene (cyclopentadienyl)(2-phenoxy)titanium chloride}, μ-oxo bis{isopropylidene(cyclopentadienyl)(2-phenoxy)titanium methoxide}, μ-oxo bis{isopropylidene(cyclopentadienyl)(3-tert-butyl-5-methyl-2-phenoxy)titanium chloride}, μ-oxo bis{isopropylidene(cyclopentadienyl)(3-tert-butyl-5-methyl-2-phenoxy)titanium methoxide}, μ-oxo bis{isopropylidene(methylcyclopentadienyl)(2-phenoxy) titanium chloride}, μ-oxo bis{isopropylidene (methylcyclopentadienyl)(2-phenoxy)titanium methoxide}, μ-oxo bis{isopropylidene(methylcyclopentadienyl)(3-tert-butyl-5-methyl-2-phenoxy)titanium chloride}, μ-oxo bis{isopropylidene(methylcyclopentadienyl)(3-tert-butyl-5-methyl-2-phenoxy)titanium methoxide}, μ-oxo bis{isopropylidene(tetramethylcyclopentadienyl)(2-phenoxy)titanium chloride}, μ-oxo bis{isopropylidene (tetramethylcyclopentadienyl)(2-phenoxy)titanium methoxide}, μ-oxo bis{isopropylidene (tetramethylcyclopentadienyl)(3-tert-butyl-5-methyl-2-phenoxy)titanium chloride}, μ-oxo bis{isopropylidene (tetramethylcyclopentadienyl)(3-tert-butyl-5-methyl-2-phenoxy)titanium methoxide}, μ-oxo bis{dimethylsilylene (cyclopentadienyl)(2-phenoxy)titanium chloride}, μ-oxo bis{dimethylsilylene(cyclopentadienyl)(2-phenoxy) titanium methoxide}, μ-oxo bis{dimethylsilylene (cyclopentadienyl)(3-tert-butyl-5-methyl-2-phenoxy) titanium chloride}, μ-oxo bis{dimethylsilylene (cyclopentadienyl)(3-tert-butyl-5-methyl-2-phenoxy) titanium methoxide}, μ-oxo bis{dimethylsilylene (methylcyclopentadienyl)(2-phenoxy)titanium chloride}, μ-oxo bis{dimethylsilylene(methylcyclopentadienyl)(2-phenoxy)titanium methoxide}, μ-oxo bis{dimethylsilylene (methylcyclopentadienyl)(3-tert-butyl-5-methyl-2-phenoxy)titanium chloride}, μ-oxo bis{dimethylsilylene (methylcyclopentadienyl)(3-tert-butyl-5-methyl-2-phenoxy)titanium methoxide}, μ-oxo bis{dimethylsilylene (tetramethylcyclopentadienyl)(2-phenoxy)titanium chloride}, μ-oxo bis{dimethylsilylene (tetramethylcyclopentadienyl)(2-phenoxy)titanium methoxide}, μ-oxo bis{dimethylsilylene (tetramethylcyclopentadienyl)(3-tert-butyl-5-methyl-2-phenoxy)titanium chloride} and μ-oxo bis{dimethylsilylene (tetramethylcyclopentadienyl)(3-tert-butyl-5-methyl-2-phenoxy)titanium methoxide}.

Examples of the transition metal complex represented by the general formula [III] include: di-μ-oxo bis{isopropylidene(cyclopentadienyl)(2-phenoxy) titanium}, di-μ-oxo his{isopropylidene(cyclopentadienyl) (3-tert-butyl-5-methyl-2-phenoxy)titanium}, di-μ-oxo bis{isopropylidene(methylcyclopentadienyl)(2-phenoxy) titanium}, di-μ-oxo bis{isopropylidene (methylcyclopentadienyl)(3-tert-butyl-5-methyl-2-phenoxy)titanium}, di-μ-oxo bis{isopropylidene (tetramethylcyclopentadienyl)(2-phenoxy)titanium}, di-μ-oxo bis{isopropylidene(tetramethylcyclopentadienyl)(3-tert-butyl-5-methyl-2-phenoxy)titanium}, di-μ-oxo bis{dimethylsilylene(cyclopentadienyl)( 2-phenoxy) titanium}, di-μ-oxo bis{dimethylsilylene(cyclopentadienyl) (3-tert-butyl-5-methyl-2-phenoxy)titanium}, di-μ-oxo bis{dimethylsilylene(methylcyclopentadienyl)(2-phenoxy) titanium}, di-μ-oxo bis{dimethylsilylene (methylcyclopentadienyl)(3-tert-butyl-5-methyl-2-phenoxy)titanium}, di-μ-oxo bis{dimethylsilylene (tetramethylcyclopentadienyl)(2-phenoxy)titanium} and di-μ-oxo bis{dimethylsilylene (tetramethylcyclopentadienyl)(3-tert-butyl-5-methyl-2-phenoxy)titanium}.

The transition metal complex represented by the general formula [I] can be synthesized according to the method described in WO 97/03992, which is incorporated herein by reference in its entirely.

The transition metal compound represented by the general formula [II] or [III] can be prepared by reacting a transition metal compound [I] with 1 or 2 equivalent amounts of water or oxygen.

Examples of the above reaction method include: a method of reacting a transition metal compound and necessary amounts of water or oxygen directly; a method of charging a transition metal compound into a solvent, such as a hydrocarbon solvent, which contains necessary amount of water or oxygen; and a method of charging a transition metal compound into a dry solvent, such as a dry hydrocarbon solvent and passing through an inert gas containing necessary amount of water or oxygen.

Next, an explanation is given on the aluminum compound (B).

As the aluminum compounds (B), these are selected one or more of aluminum compounds from the following (B1) –(B3)

(B1) an organoaluminum compound represented by the general formula $E^1_aAlZ_{3-a}$, (B2) a cyclic aluminoxane having a structure represented by the general formula $\{—Al(E^2)—O—\}_b$, and (B3) a linear aluminoxane having a structure represented by the general formula $E^3\{—Al(E^3)—O—\}_c AlE^3_2$ (wherein $E^1$, $E^2$ and $E^3$ respectively represent a hydrocarbon group, and each of $E^1$, $E^2$ and $E^3$ may be the same or different; Z represents a hydrogen atom or a halogen atom, and each of the Z may be the same or different; "a" satisfies the following equation: $0<a\leq 3$; "b" represents an integer of 2 or more; and "c" represents an integer of 1 or more).

As the hydrocarbon group in $E^1$, $E^2$ and $E^3$, a hydrocarbon group having 1–8 carbon atoms is preferable, and an alkyl group having 1–8 carbon atoms is more preferable.

Specific examples of the organoaluminum compound (B1) represented by the general formula $E^1_aAlZ_{3-a}$ include trialkylaluminum compounds such as trimethylaluminum, triethylaluminum, tripropylaluminum, triisobutylaluminum, trihexylaluminum, etc.; dialkylaluminum chlorides such as dimethylaluminum chloride, diethylaluminum chloride, dipropylaluminum chloride, diisobutylaluminum chloride, dihexylaluminum chloride, etc.; alkylaluminum dichlorides such as methylaluminum dichloride, ethylaluminum dichloride, propylaluminum dichloride, isobutylaluminum dichloride, hexylaluminum dichloride, etc.; and dialkylaluminum hydrides such as dimethylaluminum hydride, diethylaluminum hydride, dipropylaluminum hydride, diisobutylaluminum hydride, dihexylaluminum hydride, etc.

Among them, trialkylaluminum compounds are preferable, and triethylaluminum and triisobutylaluminum are more preferable.

Specific examples of $E^2$ and $E^3$ in the cyclic aluminoxane (B2) having a structure represented by the general formula $\{-Al(E^2)-O-\}_b$ and linear aluminoxane (B3) having a structure represented by the general formula $E^3\{-Al(E^3)-O-\}_c AlE^3_2$ include alkyl groups such as a methyl group, ethyl group, normal propyl group, isopropyl group, normal butyl group, isobutyl group, normal pentyl group, neopentyl group and the like, "b" is an integer of not less than 2, and "c" is an integer of not less than 1. $E^2$ and $E^3$ are preferably methyl groups or isobutyl groups, "b" is preferably 2 to 40 and "c" is preferably 1 to 40.

The above aluminoxane is produced by various methods. The method is not specifically limited, and the aluminoxane may be produced according to known methods. For example, it can be produced by bringing a solution prepared by dissolving a trialkylaluminum (e.g. trimethylaluminum, etc.) in a suitable solvent (e.g. benzene, aliphatic hydrocarbon, etc.), into contact with water. There can also be used a method of bringing a trialkylaluminum (e.g. trimethylaluminum, etc.) into contact with a metal salt containing crystallization water (e.g. copper sulfate hydrate, etc.).

Boron compound (C) is explained as follows:

As the boron compound (C), any one of boron compound ($C_1$) represented by the general formula $BQ^1Q^2Q^3$, boron compound ($C_2$) represented by the general formula $G^+(BQ^1Q^2Q^3Q^4)^-$ and boron compound ($C_3$) represented by the general formula $(L-H)^+(BQ^1Q^2Q^3Q^4)^-$ can be used.

In the boron compound ($C_1$) represented by the general formula $BQ^1Q^2Q^3$, B represents a trivalent boron atom ; and $Q^1$ to $Q^3$ may be the same or different and represent a halogen atom, a hydrocarbon group, a halogenated hydrocarbon group, a substituted silyl group, a alkoxy group or a disubstituted amino group. $Q^1$ to $Q^3$ represent preferably a halogen atom, a hydrocarbon atom having 1–20 carbon atoms, a halogenated hydrocarbon atom having 1–20 carbon atoms, a substituted silyl group having 1–20 carbon atoms, a alkoxy group having 1–20 carbon atoms or a disubstituted amino group having 2–20 carbon atoms. $Q^1$ to $Q^3$ represent more preferably a halogen atom, a hydrocarbon group having 1–20 carbon atoms or a halogenated hydrocarbon group having 1–20 carbon atoms. $Q^1$ to $Q^4$ represent further more preferably a fluorinated hydrocarbon group having 1–20 carbon atoms and having at least one fluorine atom. $Q^1$ to $Q^4$ represent especially preferably a fluorinated aryl group having 6–20 carbon atoms and having at least one fluorine atom.

Specific examples of the compound ($C_1$) include tris(pentafluorophenyl)borane, tris(2,3,5,6-tetrafluorophenyl)borane, tris(2,3,4,5-tetrafluorophenyl)borane, tris(3,4,5-trifluorophenyl)borane, tris(2,3,4-trifluorophenyl)borane, phenylbis(pentafluorophenyl)borane, etc. Among them, tris(pentafluorophenyl)borane is most preferable.

In the boron compound (C2) represented by the general formula $G^+(BQ^1Q^2Q^3Q^4)^-$, $G^+$ represents an inorganic or organic cation; B represents a trivalent boron; and $Q^1$ to $Q^4$ are the same as $Q^1$ to $Q^3$ in the above (C1).

In the compound represented by the general formula $G^+(BQ^1Q^2Q^3Q^4)^-$, specific examples of $G^+$ as an inorganic cation include ferrocenium cation, alkyl-substituted ferrocenium cation, silver cation, etc. and specific examples of $G^+$ as an organic cation include triphenylmethyl cation, etc. $G^+$ is preferably a carbenium cation, more preferably a triphenylmethyl cation.

Examples of $(BQ^1Q^2Q^3Q^4)^-$ include tetrakis(pentafluorophenyl)borate, tetrakis(2,3,5,6-tetrafluorophenyl)borate, tetrakis(2,3,4,5-tetrafluorophenyl)borate, tetrakis(3,4,5-trifluorophenyl)borate, tetrakis(2,3,4-trifluorophenyl)borate, phenyltris(pentafluorophenyl)borate, tetrakis(3,5-bistrifluorophenylmethyl)borate and the like.

Examples of the specific combinations of compounds of general formula $C_2$ include ferrocenium tetrakis(pentafluorophenyl)borate, 1,1'-dimethylferrocenium tetrakis(pentafluorophenyl)borate, silver tetrakis(pentafluorophenyl)borate, triphenylmethyl tetrakis(pentafluorophenyl)borate, triphenylmethyl tetrakis(3,5-bistrifluorophenyl)borate and the like. Among them, triphenylmethyl tetrakis(pentafluorophenyl)borate is most preferable.

In the compound (C3) represented by the general formula $(L-H)^+(BQ^1Q^2Q^3Q^4)^-$, L represents a neutral Lewis acid; $(L-H)^+$ represents a Bronsted acid; B represents a trivalent boron; and $Q^1$ to $Q^4$ are the same as $Q^1$ to $Q^3$ in the above (C1).

In the compound represented by the general formula $(L-H)^+(BQ^1Q^2Q^3Q^4)^-$, specific examples of $(L-H)^+$ as Bronstedacid include trialkyl-substituted ammonium, N,N-dialkylanilinium, dialkylammonium, triarylphosphonium, etc. and specific examples of $(BQ^1Q^2Q^3Q^4)^-$ include the same ones as those described above.

Examples of the specific combination of $(L-H)^+(BQ^1Q^2Q^3Q^4)^-$ include triethylammonium tetrakis(pentafluorophenyl)borate, tripropylammonium tetrakis(pentafluorophenyl)borate, tri(n-butyl)ammonium tetrakis(pentafluorophenyl)borate, tri(n-butyl)ammonium tetrakis(3,5-bistrifluoromethylphenyl)borate, N,N-dimethylanilium tetrakis(pentafluorophenyl)borate, N,N-diethylanilium tetrakis(pentafluorophenyl)borate, N,N-2,4,6-pentamethylanilium tetrakis(pentafluorophenyl)borate, N,N-dimethylanilium tetrakis(3,5-bistrifluoromethylphenyl)borate, diisopropylammonium tetrakis(pentafluorophenyl)borate, dicyclohexylammonium tetrakis(pentafluorophenyl)borate, triphenylphosphonium tetrakis(pentafluorophenyl)borate, tri(methylphenyl)phosphonium tetrakis(pentafluorophenyl)borate, tri(dimethylphenyl)phosphonium tetrakis(pentafluorophenyl)borate, etc. Among them, tri(n-butyl)ammonium tatrakis(pentafluoro)borate or N,N-dimethylanilinium tetrakis(pentafluorophenyl)borate is most preferable.

In copolymerizing, there is used a catalyst for olefin polymerization comprising the transition metal complex (A) represented by the general formula [I] and above-mentioned compound(s) (B) and/or (C). In case of using a catalyst for olefin polymerization comprising the two components of (A) and (B), preferable compounds (B) are the above-mentioned cyclic aluminoxane (B2) and/or the linear aluminoxane (B3). As the other preferable mode of a catalyst for olefin polymerization, there can be given a catalyst for olefin polymerization comprising (A), (B) and (C), wherein said (B1) is preferable.

Each catalyst component is used so that a molar ratio of (B) to (A) is preferably from about 0.1 to 10000, more preferably from about 5 to 2000, and a molar ratio of (C) to (A) is preferably from about 0.1 to 100, more preferably from about 0.5 to 10.

With regard to the concentration of each catalyst component used in the state of a solution or in a state of suspension in the solvent, optional selection is made depending on the capacity of the apparatus for supplying each component to the polymerization reactor and the like. Each component is used so that an amount of (A) is preferably from about 0.01 to 500 µmol/g, more preferably from about 0.05 to 100 µmol/g, further preferably from about 0.05 to 50 µmol/g, the amount of (B) is preferably from about 0.01 to 10000 µmol/g, more preferably from about 0.1 to 5000 µmol/g, most preferably from about 0.1 to 2000 µmol/g, in terms of Al atom, and an amount of (C) is preferably from about 0.01 to 500 µmol/g, more preferably from about 0.05 to 200 µmol/g, most preferably from about 0.05 to 100 µmol/g.

The ethylene-isoprene copolymer of the present invention can be produced by a solution polymerization using an aliphatic hydrocarbon such as butane, pentane, hexane, heptane, octane or the like, an aromatic hydrocarbon such as benzene, toluene or the like, or a halogenated hydrocarbon such as methylene chloride or the like; or a slurry polymerization; or a gas-phase polymerization in a gaseous phase monomer. It can also be produced by both of a continuous polymerization and a batch polymerization. The polymerization temperature is usually within the range of about −70 to 350° C., preferably about −50 to 220° C. and more preferably about −20 to 120° C. The polymerization pressure is usually within the range of about atmospheric pressure to 350 MPa, preferably about atmospheric pressure to 100 MPa and more preferably about atmospheric pressure to 10 MPa. The polymerization time is suitably determined depending generally on the kind of catalyst and apparatus to be used and may usually be within a range of about 1 minute to 20 hours. In order to adjust the molecular weight of the polymer, a chain transfer agent such as hydrogen, or the like, can be added.

The elastomer composition of the present invention is an elastomer composition comprising about 100 parts by weight of an ethylene-isoprene random copolymer of the present invention, about 5 to 400 parts by weight of inorganic filler and/or carbon black and about 0.1 to 20 parts by weight of a cross-linking agent.

The total content of inorganic filler and/or carbon black is about 5 to 400 parts by weight, preferably about 10 to 200 parts by weight. When said content is too low, a sufficient reinforcing effect can not be obtained sometimes. On the other hand, when said content is too high, the viscosity of the composition may increase and the processability may become poor.

Specific examples of inorganic fillers are glass flakes, clay, silica, glass balloon, glass bead, mica, talc, calcium carbonate, titanium dioxide, potassium titanate whiskers, and barium sulfate.

The cross-linking agent used in the ethylene-isoprene random copolymer composition can arbitrarily be selected one or more agents from various cross-linking agents depending on the desired use. These cross-linking agents include sulfur cross-linking agents, inorganic cross-linking agents, polyamine cross-linking agents, resin cross-linking agents, sulfur-compound cross-linking agents, oximes and nitroso cross-linking agents, organic peroxide cross-linking agents and other cross-linking agents. Specific examples of the sulfur cross-linking agents may include powdered sulfur, precipitated sulfur, colloidal sulfur, surface-treatedsulfur, insolublesulfur, non-staining sulfur donor and the like. Specific examples of the inorganic cross-linking agents may include selenium, tellurium, magnesium oxide, litharge (lead monooxide), zinc oxide and the like. Specific examples of the polyamine cross-linking agents may include hexamethylene diamine, triethylene tetramine, tetraethylene pentamine, hexamethylene diamine carbamate, N,N'-dicinnamylidene-1,6-hexanediamine, 4,4'-methylenebis (cyclohexylamine) carbamate, 4,4'-methylenebis(2-chloroaniline) and the like. Specific examples of the resin cross-linking agents may include alkylphenol-formaldehyde resin, melamine-formaldehyde condensate, triazine-formaldehyde condensate, sulfurised-p-tert-butyl phenol resin, alkylphenol sulfide resin, hexamethoxymethylmelamine resin and the like. Specific examples of the sulfur-compound cross-linking agents may include sulfur monochloride, sulfur dichloride, morpholine disulfide, alkylphenol disulfide, polysulfide, -accelerators containing sulfur and the like. Specific examples of oximes and nitroso cross-linking agents may include p-quinone dioxime, p,p'-dibenzoylquinone dioxime, tetrachloro-p-benzoquinone, poly-p-dinitrosobenzene and the like. Specific examples of the organic peroxide cross-linking agents may include tert-butyl hydroperoxide, 1,1,3,3-tetramethylbutyl hydroperoxide, p-menthane hydroperoxide, cumene hydroperoxide, diisopropylbenzene hydroperoxide, 2,5-dimethylhexane-2,5-dihydroperoxide, di-tert-butyl peroxide, dicumyl peroxide, tert-butyl cumyl peroxide, 1,1-bis-(tert-butylperoxy)cyclododecane, 2,2-bis(tert-butylperoxy)octane, 1,1-di-tert-butylperoxycyclohexane, 2,5-dimethyl-2,5-di(tert-butylperoxy)hexane, 2,5-dimethyl-2,5-di(tert-butylperoxy)hexyne-3, 1,3-bis(tert-butylperoxyisopropyl)benzene, 2,5-dimethyl-2,5-di (benzoylperoxy)hexane, 1,1-bis(tert-butylperoxy)- 3,3,5-trimethylcyclohexane, n-butyl-4,4-bis(tert-butylperoxy) valerate, benzoyl peroxide, m-tolouyl peroxide, p-chlorobenzoyl peroxide, 2,4-dichlorobenzoyl peroxide, tert-butylpeoxy isobutyrate, tert-butylperoxy 2-ethylhexanoate, tert-butylperoxy benzoate, tert-butylperoxy isopropyl carbonate, tert-butylperoxy allyl carbonate, acrylic cross-linking agents and the like. Said other cross-linking agents may include ethylene glycol dimethacrylate, trimethylolpropane trimethacrylate, polyfunctional methacrylate monomer, polyhydric alcohol methacrylate, N,N'-m-phenylene bismaleimide, ammonium benzoate, monomer containing silicate fillers, triallyl isocyanurate, containing metal monomer, zinc methacrylate, magnesium methacrylate, zinc dimethacrylate, magnesium dimethacrylate, 2,4,6-trimercapto-S-triazine, N,N'-bis(2-methyl-2-nitropropyl)-1,6-hexanediamine, isocyanuric acid, thiadiazole derivatives, cationic active agents, special blend of vulcanizing agents, high purity industrial soaps and the like. These cross-linking agents are arbitrarily selected according to the desired use. The amount of the cross-linking agent to be used is again arbitrarily selected according to the required cure rate, required property of the cross-linked product and so on. The content of the cross-linking agent per 100 parts by weight of ethylene-isoprene random copolymer is usually about 0.1 to 20 parts by weight and preferably about 0.2 to 10 parts by weight. When the content is too little, almost no cross-linking may proceed, and on the other hand, when the content is excessive, the physical property of the cross-linked product may be deteriorated.

As required, it is possible to mix or add various known additives (see: Compounding Ingredients for Rubber and Plastics, revised second edition, Rubber-Digest Co.) to the elastomer composition of the present invention. Examples of the additives include vulcanization accelerators, activators, retardersantioxidants, antiozonants, ultraviolet light absorbers, light stabilizers, peptizing agents, tackifiers, plasticizers, rubbersofteners, reinforcingagents, fillers, reinforcers, blowingagents, blowingpromoters, lubricants, slipagents, internal parting agents, anti-clouding agents, flame retardants, internal anti-static agents, coloring agents, coupling agents, preservatives, fungicides and the like. The following is a listing of specific examples or a part of classification of the additives described in the known literature (Compounding Ingredients for Rubber and Plastics, revised second edition, Rubber-Digest Co.). First, specific examples of the vulcanization accelerators include compounds classified as guanidines, aldehyde-ammonias, aldehyde-amines, thiazoles, sulfaminamides, thioureas, thiurams, dithiocarbamates, xanthates and other compounds. Specific examples of the activators include metal oxides, metallic carbonates, fatty acids and derivatives thereof and amines. Specific examples of retarders include organic acids and nitroso compounds. Specific examples of antioxidants or antiozonants include naphthylamines, diphenylamines, p-phenylenediamines and quinolines; hydroquinone derivatives; imonophenols, bis- or tris-phenols, thiobisphenols, hindered phenols and phosphites; waxes; copper inhibitors and the like. Specific examples of the ultraviolet light absorbers or light stabilizers include salicylic acid derivatives; benzophenones, benzotriazoles and hindered amine light stabilizers. Specific examples of peptizing agents include mixtures of pentachlorothiophenol with activating additives, zinc salt of pentachlorothiophenol, mixed diaryl disulfide and the like. Specific examples of the tackifiers include coumarone-indene resin, phenol-formaldehyde resin, xylene-formaldehyde resin, polyterpene resin, petroleum hydrocarbon resins, rosin derivatives and the like. Specific examples of the plasticizers include phthalic acid (derivatives, isophthalic acid derivatives, tetrahydrophthalic acid derivatives, adipic acid derivatives, azelaic acid derivatives, sebacic acid derivatives, dodecane-2-acid derivatives, maleic acid derivatives, fumaric acid derivatives, trimellitic acid derivatives, pyromellitic acid derivatives, citric acid derivatives, itaconic acid derivatives, oleic acid derivatives, ricinoleic acid derivatives, stearic acid derivatives, other fatty acid derivatives, sulfonic acid derivatives, phosphoric acid derivatives, glutaric acid derivatives, other monoester plasticizers, glycol derivatives, glycerol derivatives, paraffin derivatives, epoxy derivatives, polyesters, polyethers, poly-α-methylstyrene, low molecular weight polystyrene, liquidpolychloroprene, depolymerized rubber and the like. Specific examples of the rubber softeners include mineral oil softners, vegetable oil softeners, rubber substitute (factice), fatty acids and fatty acid salts and the like. Specific examples of the rubber reinforcing agents include carbon black, inorganic reinforcing agents and organic reinforcing agents. Specific examples of the fillers or reinforcers include inorganic fillers, organic fillers and plastic reinforcers. Specific examples of the blowing agents or blowing promoters include inorganic blowing agents, nitroso compounds, azo compounds, sulfonyl hydrazides and the like. Specific examples of the lubricants, slip agents, internal parting agents, anti-clouding agents, or flame retardants includeparaffinandhydrocarbonresins, fattyacids, fatty acid amides, fatty acid esters, fatty alcohols and partial esters of fatty acids and polyhydric alcohols. Specific examples of the internal anti-static agents include cationic active agents, quaternary ammonium salts, stearamidepropyldimethyl-β-hydroxyethyl ammonium and the like. Specific examples of the coloring agents include inorganic pigments, organic pigments, organic fluorescent pigments, pearl essence and the like. Specific examples of the coupling agents include silanes, alminates, or titanates. The amount of these additives to be combined is not particularly limited because the amount is adjusted according to the desired use or purpose.

These additives are usually mixed using a Brabender, Banbury mixer, kneader, roll mill or like before the cross-linking reaction to give the elastomer rubber composition of the present invention. The elastomer composition can be molded into a desired shape by an extruder, kneader, mixing mill or press machine.

The primary vulcanization is performed usually by heating for 1 to 60 minutes at 120° C. or more, preferably 130 to 200° C., under atmospheric pressure to 15 MPa. The after vulcanization is performed heating for 1 to 20 hours at 130 to 200° C., as needed.

The ethylene-isoprene random copolymer, elastomer composition and cross-linked elastomer composition of the present invention can be blended with a resin, another rubber or the like. For example, the blending may be carried out with a polyethylene resin such as a high density polyethylene, a medium density polyethylene, a low density polyethylene, LLDPE (linear low density polyethylene) or the like; a polypropylene resin; a poly-4-methylpentene-1; polystyrene; a polyester; a polyamide; a polyphenylene ether; a polyolefin resin; an ethylene-α-olefin copolymer rubber; an ethylene-propylene-non-conjugated diene copolymer rubber; an ethylene-α-olefin-non-conjugated diene copolymer rubber; a polybutadiene; a styrene-butadiene block copolymer rubber; a styrene-butadiene-styrene block copolymer rubber; a styrene-butadiene random copolymer rubber; a partially hydrogenated styrene-butadiene-styrene block copolymer rubber; a partially hydrogenated styrene-butadiene random copolymer rubber; a styrene-isoprene block copolymer rubber; a partially hydrogenated styrene-isoprene block copolymer rubber; a polyacrylonitrile rubber; an acrylonitrile-butadiene copolymer rubber; a partially hydrogenated acrylonitrile-butadiene copolymer rubber; a isobutylene-isoprene rubber; a chloroprene rubber; a fluorocarbon rubber; a chlorosulfonated polyethylene; a silicone rubber; a urethane rubber; a natural rubber or the like. In addition, if necessary, it is possible to carry out the cross-linking reaction by adding a cross-linking agent such as a peroxide or sulfur. Furthermore, if necessary, it is possible to blend an antioxidant, a thermal stabilizer, an ultraviolet light absorber, a lubricant, an antistatic, a pigment, a filler or a flame retardant. Methods for obtaining a blended product of the elastomer composition of the present invention with a resin or another rubber include methods in which the ingredients are melt-kneaded with a twin screw extruder, a Banbury mixer or the like. The ethylene-isoprene random copolymer, elastomer composition and cross-linked elastomer composition of the present invention have characteristics described above, and can most suitably be used for modifier for various resins, automobile parts applications, electric parts applications, industrial parts applications, building material parts applications and so on.

EXAMPLES

[I] Method for Measurements (1) Intrinsic viscosity [η]

Intrinsic viscosity [η] was measured in xylene at 70° C. using an Ubbellohde viscometer. A sample of 300 mg was dissolved in 100 ml of xylene to form a solution having a concentrationof 3 mg/ml. The solution was diluted ½, ⅓ and ⅕, and each of the dilutions were measured in a constant temperature water-bath at 70° C. (±1° C.). The measurement was repeated 3 times, at respective concentrations, and an average value of the obtained results was used.

(2) Molecular weight distribution

Molecular weight distribution was measured by a gel permeation chromatography (GPC) method (using a GPC apparatus 150C, manufactured by Waters Co.). The measurement was conducted at an elution temperature of 140° C. using a Shodex Packed Column A-80M, manufactured by Showa Denko K. K., as a column andapolystyrene (molecular weight: 68 to 8,400,000, manufactured by Tosoh Co.) as the standard substance for molecular weight. A weight average molecular weight (Mw) anda number average molecular weight (Mn) which are in terms of polystyrene, were obtained and the ratio of them (Mw/Mn) was taken as the molecular weight distribution. A sample of about 5 mg of polymer for measurement was dissolved in 5 ml of o-dichlorobenzene to form a solution having a concentration of about 1 mg/ml. A 400 µl portion of the obtained sample solution was injected. The flow rate of eluting solvent was 1.0 ml/minute and the detection was carried out with a refraction index detector.

(3) Measurement of GPC-IR

The measurement was conducted by a gel permeation chromatograph method (apparatus: CFCT-150A, manufactured by Dia Instrument co., LTD.)/Fourier transform infrared spectrophotometry (apparatus: Magna 550 FTIR, manufactured by Nicolet Japan Corporation). The elution temperature was 140° C. and two UT-806M columns, manufactured by Showa Denko K. K., were used. A sample of 100 mg of the polymer was dissolved in 25 ml of o-dichlorobenzene and a 0.8 ml portion of the obtained sample solution was injected. The resulting solution was introduced into the FT-IR apparatus and absorption peaks due to C—H stretching vibrations at 2,842 to 2,982 cm$^{-1}$ were analyzed.

(4) Density

Density was measured according to JIS K-6760 (as a value at 23° C.).

(5) Iodine value

An iodine value was measured by a titration method and the isoprene content (in % by mole) was calculated from this value.

(6) Structure of isoprene contained in copolymer

The structure of isoprene was estimated based on an integrated intensity of assigned signals in a nuclear magnetic resonance spectrum:

| trans-1,4 | 1.62–1.65 (3H) |
| cis-1,4 | 1.71–1.73 (3H) |
| 1,2 | 4.90 (2H) |
| 3,4 | 4.81 (2H) |
| trans-1,4 + cis-1,4 | 5.24 (2H) |

[II] Preparation of the catalyst for polymerization (1) Synthesis of transition metal complex (dimethylsilyl (tetramethylcyclopentadienyl)(3-tert-butyl-5-metyl-2-phenoxy)titanium dichloride)

(a) Synthesis of 1-bromo-3-tert-butyl-5-methyl-2-phenol

In a 500 ml four-necked flask equipped with a stirrer, 20.1 g (123 mmol) of 2-tert-butyl-4-methylphenol was dissolved in 150 ml of toluene under nitrogen atmosphere, then, to this was added 25.9 ml (18.0 g, 246 mmol) of tert-butylamine. This solution was cooled to −70° C., and 10.5 ml (32.6 g, 204 mmol) of bromine was added. This solution was kept at −70° C., and stirred for 2 hours. Then, the solution was warmed to room temperature, and washed three times with adding 100 ml of 10% diluted hydrochloric acid for each time. The organic layer obtained after the washing was dried over anhydrous sodium sulfate, the solvent was removed by using an evaporator, then, the product was purified using a silica column to obtain 18.4 g (75.7 mmol) of $^1$-bromo-3-tert-butyl-5-methyl-2-phenolas a colorless oil. The yield was 62%.

(b) Synthesis of 1-bromo-3-tert-butyl-2-methoxy-5-methylbenzene

In a 100 ml four-necked flask equipped with a stirrer, 13.9 g (57.2 mmol) of 1-bromo-3-tert-butyl-5-methyl-2-phenol synthesized in the above-described process (a) was dissolved in 40 ml of acetonitrile under nitrogen atmosphere, then, to this was added 3.8 g (67.9 mmol) of potassium hydroxide. Further, 17.8 ml (40.6 g, 286 mmol) of methyl iodide was added, and the mixture was stirred for 12 hours. Then, the solvent was removed by using an evaporator, and 40 ml of hexane was added to the residue and the hexane-soluble portion was extracted. The extraction was repeated three times. The solvent was removed from the extract, to obtain 13.8 g (53.7 mmol) of 1-bromo-3-tert-butyl-2-methoxy-5-methylbenzene as a pale yellow oil. The yield was 94%.

(c) Synthesis of (3-tert-butyl-2-methoxy-5-methylphenyl) chlorodimethylsilane

To a solution composed of tetrahydrofuran (31.5 ml), hexane (139 ml) and 1-bromo-3-tert-butyl-2-methoxy-5-methylbenzene (45 g) synthesized in the above-described process (b) was added a solution of n-butyllithium in hexane (115 ml) (1.6 mol/liter) at −40° C. over 20 minutes dropwise. The resulting mixture was kept at −40° C. for 1 hour, then, tetrahydrofuran (31.5 ml) was added dropwise.

To a solution composed of dichlorodimethylsilane (131 g) and hexane (306 ml) was added the mixture obtained above at −40° C. dropwise. The resulting mixture was warmed to room temperature over 2 hours, and stirred for 12 hours further at room temperature.

The solvent and excess dichlorodimethylsilane were distilled off from the reaction mixture under reduced pressure, and the hexane-soluble portion was extracted from the residue using hexane, and the solvent was distilled off from the resulting hexane solution, to obtain 41.9 g of (3-tert-butyl-2-methoxy-5-methylphenyl)chlorodimethylsilane as a pale yellow oil. The yield was 84%.

(d) Synthesis of (3-tert-butyl-2-methoxy-5-methylphenyl) dimethyl(tetramethylcyclopentadienyl) silane To a solution composed of (3-tert-butyl-2-methoxy-5-methylphenyl)chlorodimethylsilane (5.24 g) synthesized in the above-described process (c) and tetrahydrofuran (50 ml) was added tetramethylcyclopentadienyl lithium (2.73 g) at −35° C., the mixture was warmed to room temperature over 2 hours, and stirred for 10 hours further at room temperature.

The solvent was distilled off from the resulting reaction mixture under reduced pressure, the hexane-soluble portion was extracted using hexane, and the solvent was distilled off from the resulting hexane solution under reduced pressure, to obtain 6.69 g of (3-tert-butyl-2-methoxy-5-methylphenyl) dimethyl(tetramethylcyclopentadienyl)silane as a yellow oil. The yield was 97%.

(e) Synthesis of dimethylsilyl (tetramethylcyclopentadienyl)(3-tert-butyl-5-methyl-2-phenoxy)titanium dichloride To a solution composed of (3-tert-butyl-2-methoxy-5-methylphenyl)dimethyl(tetramethylcyclopentadienyl) silane (10.04 g) synthesized in the above-described process (d), toluene (100 ml) and triethylamine (6.30 g) was added a solution of n-butyllithium in hexane (19.0 ml)(1.63 mol/liter) dropwise, then, the mixture was warmed to room temperature over 2 hours, and stirred for 12 hours further at room temperature.

To a solution of titanium tetrachloride (4.82 g) in toluene (50 ml) was added the mixture obtained above at 0° C. under nitrogen atmosphere dropwise, then, the mixture was warmed to room temperature over 1 hour, and heated under reflux for 10 hours.

The reaction mixture was filtered, the solvent was distilled off from the filtrate, and the residue was re-crystallized from a toluene-hexane mixture solvent, to obtain 3.46 g of dimethylsilyl(tetramethylcyclopentadienyl)(3-tert-butyl-5-methyl-2-phenoxy) titanium dichloride as an orange columnar crystal. The yield was 27%.

Spectral data is as follows.

$^1$H-NMR (CDCl$_3$) δ 0.57 (s, 6H), 1.41 (s, 9H), 2.15 (s, 6H), 2.34 (s, 6H), 2.38 (s, 3H), 7.15 (s, 1H), 7.18 (s, 1H)

$^{13}$C-NMR (CDCl$_3$) δ 1.25, 14.48, 16.28, 22.47, 31.25, 36.29, 120.23, 130.62, 131.47, 133.86, 135.50, 137.37, 140.82, 142.28, 167.74

MS (CI, m/e) 458

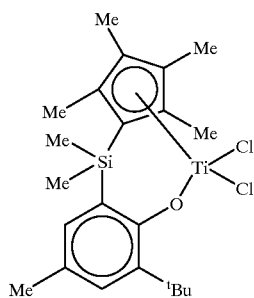

[III] Polymerization reaction

Example 1

Nitrogen gas was introduced into a 2-liter separable flask equipped with a stirrer, a thermometer, a dropping funnel and a reflux condenser by reducing pressure in order to replace the inside atmosphere with nitrogen gas. Into this flask was introduced 1 liter of dried hexane as a solvent for polymerization. Ethylene (8 liter/minute) was continuously fed into the flask and the temperature of the solvent was adjusted to 0° C. using a constant temperature water-bath. Isoprene (25 mmol) was added thereto and the addition of a hexane solution of triisobutyl aluminum (0.5 mmol/Al) to the solvent forpolymerization followed. Then, a solution of dimethyl silyl (tetramethylcyclopentadienyl) (3-tert-butyl-5-methyl-2-phenoxy) titanium dichloride in hexane (0.002 mmol/Ti) was added to the solvent for polymerization, followed by the addition of a solution of trispentafluorophenyl borate in toluene (0.01 mmol/B). After stirring for 30 minutes, methanol was added to stop the reaction and the solvent was removed to give 7.4 g of ethylene-isoprene random copolymer. The isoprene structure of the obtained ethylene-isoprene copolymer was analyzed by $^1$H-NMR. The content of 1,4-bonding was 99% by mole or more.

Examples 2–4

The procedure in Example 1 was substantially repeated. Detailed conditions for polymerization and results of evaluation of copolymer are shown in Table 1.

Example 5

Into an autoclave sufficiently purged with nitrogen gas was charged 800 ml of hexane, which was cooled to 0° C. To this were added 50 mmol of isoprene and 2 g of ethylene, followed by the addition of a hexane solution of TIBA (1.5 mmol/Al) to the solvent for polymerization. Then, a solution of dimethyl silyl (tetramethylcyclopentadienyl) (3-tert-butyl-5-methyl-2-phenoxy) titanium dichloride in hexane (0.005 mmol/Ti) was added to the solvent for polymerization, followed by the addition of a solution of trispentafluorophenyl borate in toluene (0.025 mmol/B). The pressure of ethylene was kept at 0.1 MPa (gauge) during the polymerization. After stirring for 7 minutes, methanol was added to stop the reaction and the solvent was removed to give 4.8 g of ethylene-isoprene random copolymer. The isoprene structure of the obtained ethylene-isoprene copolymer was analyzed by $^1$H-NMR. The content of 1,4-bonding was 99% by mole or more.

Examples 6–12

The procedure in Example 5 was substantially repeated. Detailed conditions for polymerization and the results of the evaluation of copolymer are shown in Table 1.

Comparative Example 1

The procedure for polymerization in Example 5 was repeated except that ethylene was not used as a monomer and a polymerization was conducted by using isoprene alone. As the result, no formation of polymer was observed.

[IV] Preparation and evaluation of compositions

Then, the ethylene-isoprene random copolymers obtained in Example 9 and Example 12 were kneaded into a formulation, shown below, with an 8-inch open roll to give elastomer compositions.

The cure rate and crosslinking density of said elastomer compositions were measured at a condition of 145° C. using an oscillating disc rheometer manufactured by Toyo Seiki Seisaku-Sho, Ltd.

Formulation: polymer; 100, HAF-carbon black; 50, aromatic processing oil; 5, antioxidant 1, zinc oxide; 5, stearic acid; 2, dibenzothiazyl disulfide; 0.8, tetramethylthiuram disulfide; 0.3, sulfur; 2.

The results showed the following facts. When compared with commercially available EPDM-ENB or a synthetic isoprene rubber, the ethylene-isoprene random copolymer of the present invention had a cure rate comparable to the synthetic isoprene rubber and a high crosslinking density as compared with EPDM-ENB and synthetic isoprene rubber.

TABLE 1

|  | Example | | | |
| --- | --- | --- | --- | --- |
|  | 1 | 2 | 3 | 4*$^1$ |
| Polymerization temperature (° C.) | 0 | 0 | 0 | 0 |
| Polymerization time (minutes) | 30 | 30 | 30 | 30 |
| Amount of isoprene (mmol) | 25 | 50 | 100 | 50 |
| Yield (g) | 7.4 | 6.3 | 3.3 | 10.1 |
| Catalytic activity (Pg/cat · mmol · h) | 7.4E + 3 | 6.3E + 3 | 3.3E + 3 | 10.1E + 3 |
| Iodine value | 17.1 | 34.5 | 56.6 | 24.1 |
| Content of isoprene |  |  |  |  |
| (mol %) | 1.9 | 4.0 | 6.8 | 2.8 |
| (wt %) | 5 | 9 | 15 | 6.5 |
| Density (g/ml) | 0.914 | 0.916 | 0.912 | 0.936 |
| [η] dl/g | 3.43 | 2.77 | 1.48 | 0.5 |

TABLE 1-continued

| | Example | | | |
|---|---|---|---|---|
| | 1 | 2 | 3 | 4*1 |
| Mn | 275E + 3 | 211E + 3 | 96E + 3 | 42E + 3 |
| Mw | 633E + 3 | 443E + 3 | 201E + 3 | 111E + 3 |
| Q | 2.3 | 2.1 | 2.1 | 2.7 |
| Ratio of binding type of isoprene moiety: | | | | |
| trans-1,4 (%) | 55 | 55 | 53 | <10 |
| cis-1,4 (%) | 45 | 45 | 47 | >90 |
| 1,2 or 3,4 (%) | No peak | No peak | No peak | No peak |

*1In place of dimethyl silyl (tetramethylcyclopentadienyl) (3-tert-butyl-5-methyl-2-phenoxy) titanium dichloride there was used isopropylidene (cyclopentadienyl) (3-tert-butyl-5-methyl-2-phenoxy) titanium dichloride.

TABLE 2

| | Example | | | |
|---|---|---|---|---|
| | 5 | 6 | 7 | 8 |
| Polymerization temperature (° C.) | 0 | 0 | 0 | 0 |
| Polymerization time (minutes) | 7 | 8 | 13 | 13 |
| Amount of isoprene (mmol) | 50 | 100 | 250 | 500 |
| Yield (g) | 4.8 | 3.1 | 5.6 | 6.2 |
| Catalytic activity (Pg/cat · mmol · h) | 8.2E + 3 | 4.7E + 3 | 5.2E + 3 | 5.7E + 3 |
| Iodine value | 34.8 | 50.5 | 95.9 | 124.8 |
| Content of isoprene | | | | |
| (mol %) | 4.0 | 6.1 | 12.5 | 17.1 |
| (wt %) | 9 | 14 | 26 | 33 |
| Density (g/ml) | 0.926 | 0.924 | 0.908 | 0.893 |
| [η] dl/g | 2.15 | 1.54 | 1.14 | 1.43 |
| Mn | 156E + 3 | 105E + 3 | 81E + 3 | 108E + 3 |
| Mw | 327E + 3 | 221E + 3 | 147E + 3 | 212E + 3 |
| Q | 2.1 | 2.1 | 1.8 | 2.0 |
| Ratio of binding type of isoprene moiety: | | | | |
| trans-1,4 (%) | 57 | 50 | 52 | 46 |
| cis-1,4 (%) | 43 | 43 | 46 | 51 |
| 1,2 or 3,4 (%) | No peak | 7 | 2 | 3 |

TABLE 3

| | Example | | | |
|---|---|---|---|---|
| | 9 | 10 | 11 | 12 |
| Polymerization temperature (° C.) | 0 | 0 | 30 | 30 |
| Polymerization time (minutes) | 20 | 15 | 3 | 5 |
| Amount of isoprene | 1000 | 1500 | 100 | 500 |
| Yield (g) | 6.5 | 4.6 | 7.1 | 7.8 |
| Catalytic activity (Pg/cat · mmol · h) | 3.9E + 3 | 3.7E + 3 | 2.8E + 3 | 18.7E + 3 |
| Iodine value | 136.8 | 205.4 | 39.7 | 101.4 |
| Content of isoprene | | | | |
| (mol %) | 19.2 | 33.5 | 4.7 | 13.3 |
| (wt %) | 37 | 55 | 11 | 27 |
| Density (g/ml) | 0.900 | 0.897 | 0.928 | 0.905 |
| [η] dl/g | 1.05 | 1.05 | 1.22 | 1.00 |
| Mn | 74E + 3 | 91E + 3 | 68E + 3 | 66E + 3 |
| Mw | 152E + 3 | 176E + 3 | 150E + 3 | 132E + 3 |
| Q | 2.1 | 1.9 | 2.2 | 2.0 |

TABLE 3-continued

| | Example | | | |
|---|---|---|---|---|
| | 9 | 10 | 11 | 12 |
| Ratio of binding type of isoprene moiety: | | | | |
| trans-1,4 (%) | 48 | 46 | 48 | 51 |
| cis-1,4 (%) | 49 | 49 | 46 | 47 |
| 1,2 or 3,4 (%) | 3 | 5 | 6 | 2 |

TABLE 4

| Copolymer | Example 13 Obtained in Example 12 | Example 14 Obtained in Example 9 | Comparative example 2 Synthetic isoprene rubber | Comparative example 3 EPDM-ENB |
|---|---|---|---|---|
| Evaluation* | | | | |
| MH (N-m)*2 | 8.41 | 7.79 | 4.39 | 7.0 |
| ML (N-m)*3 | 0.27 | 0.37 | 0.81 | 1.31 |
| $t_c'90$ (min)*4 | 11.7 | 10.7 | 9.3 | 26.4 |

*2MH: maximum torque value
*3ML: minimum torque value
*4$t_c'$(90): optimum vulcanization time As described above, the present invention provides an ethylene-isoprene random copolymer having a fast cure rate and a high crosslinking density, as well as an elastomer composition and a cross-linked elastomer composition using said ethylene-isoprene random copolymer.

Each of the publications and patent documents referenced in the instant disclosure is incorporated herein by reference in its entirety.

The present invention is only limited by the scope of the claims appended hereto and the equivalents encompassed thereby.

What is claimed is:

1. An ethylene-isoprene random copolymer having an isoprene content of from about 1.5 to 35% by mole wherein said copolymer is obtained by polymerizing ethylene and isoprene in the presence of a catalyst comprising (A) and (B), (A) and (C), or (A), (B) and (C) as set forth below:

(A): at least one transition metal complex represented by the following general formulae (I) to (III):

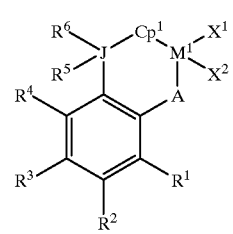

[II]

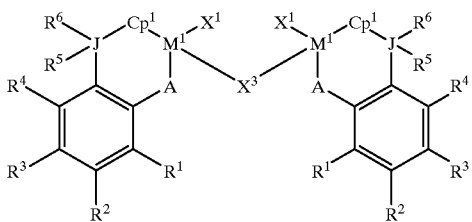

[III]

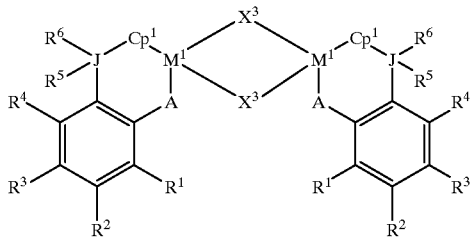

wherein in each of the above-described general formulae (I) to (III), $M^1$ represents a transition metal atom of group IV of the periodic table of elements; A represents an atom of group XVI of the periodic table of elements; J represents an atom of group XIV of the periodic table of elements; $Cp^1$ represents a group having a cyclopentadiene-type anion skeleton; $X^1$, $X^2$, $R^1$, $R^2$, $R^3$, $R^4$, $R^5$ and $R^6$ each independently represents a hydrogen atom, a halogen atom, an alkyl group, an aralkyl group, an aryl group, a substituted silyl group, an alkoxy group, an aralkyloxy group, an aryloxy group or a di-substituted amino group; $X^3$ represents an atom of group XVI of the periodic table of elements; $R^1$, $R^2$, $R^3$, $R^4$, $R^5$ and $R^6$ may optionally be connected to form a ring; and two groups represented by $M^1$, A, J, $Cp^1$, $X^1$, $X^2$, $X^3$, $R^1$, $R^2$, $R^3$, $R^4$, $R^5$ and $R^6$ in the formulae (I) to (III) may be the same or different;

(B): one or more aluminum compounds selected from the following compounds (B1) to (B3):
  (B1): an organic aluminum compound represented by the general formula: $E^1_a AlZ_{3-a}$,
  (B2): a cyclic aluminoxane having a structure represented by the general formula: $\{-Al(E^2)-O-\}_b$ and
  (B3): a linear aluminoxane having a structure represented by the general formula $E^3\{Al-(E^3)-O-\}_c AlE^3_2$, wherein each of $E^1$, $E^2$ and $E^3$ represents a hydrocarbon group, and all groups represented by $E^1$, $E^2$ and $E^3$ may be same or different, respectively, Z represents a hydrogen atom or a halogen atom, and all groups represented by Z may be same or different, "a" represents a number satisfying $0<a\leq 3$, "b" represents an integer of 2 or more and "c" represents an integer of 1 or more;

(C): a boron compound selected from any of the following (C1) to (C3),
  (C1): a boron compound represented by the general formula $BQ^1Q^2Q^3$,
  (C2): a boron compound represented by the general formula $G^+(BQ^1Q^2Q^3Q^4)^-$ and
  (C3): a boron compound represented by the general formula $(L-H)^+(BQ^1Q^2Q^3Q^4)^-$,
wherein B is a boron atom in a valence condition of 3, $Q^1$ to $Q^4$, respectively, represent a halogen atom, a hydrocarbon group, a halogenated hydrocarbon group, a substituted silyl group, an alkoxy group or a di-substituted amino group, and they may be same or different, $G^+$ represents an inorganic or organic cation, L represents a neutral Lewis acid and $(L-H)^+$ represents a Bronstead acid.

2. An ethylene-isoprene random copolymer having a Q-value of about 3.5 or less, wherein the Q-value is a ratio of the weight average molecular weight (Mw) to the number average molecular weight (Mn), wherein said copolymer is obtained by polymerizing ethylene and isoprene in the presence of a catalyst comprising (A) and (B), (A) and (C), or (A), (B) and (C) as set forth below:

(A): at least one transition metal complex represented by the following general formulae (I) to (III):

[I]

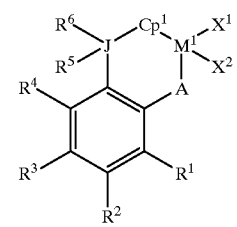

[II]

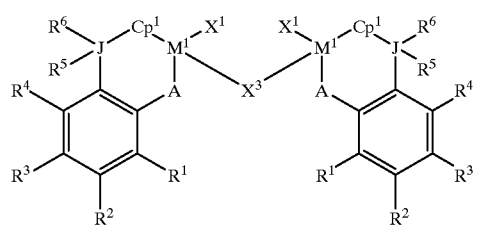

[III]

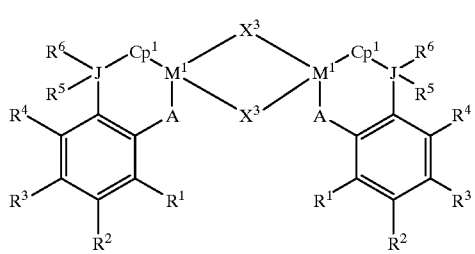

wherein in each of the above-described general formulae (I) to (III), $M^1$ represents a transition metal atom of group IV of the periodic table of elements; A represents an atom of group XVI of the periodic table of elements; J represents an atom of group XIV of the periodic table of elements; $Cp^1$ represents a group having a cyclopentadiene-type anion skeleton; $X^1$, $X^2$, $R^1$, $R^2$, $R^3$, $R^4$, $R^5$ and $R^6$ each independently represents a hydrogen atom, a halogen atom, an alkyl group, an aralkyl group, an aryl group, a substituted silyl group, an alkoxy group, an aralkyloxy group, an aryloxy group or a di-substituted amino group; $X^3$ represents an atom of group XVI of the periodic table of elements; $R^1$, $R^2$, $R^3$, $R^4$, $R^5$ and $R^6$ may optionally be connected to form a ring; and two groups represented by $M^1$, A, J, $Cp^1$, $X^1$, $X^2$, $X^3$, $R^1$, $R^2$, $R^3$, $R^4$, $R^5$ and $R^6$ in the formulae (I) to (III) may be the same or different;

(B): one or more aluminum compounds selected from the following compounds (B1) to (B3):
  (B1): an organic aluminum compound represented by the general formula: $E^1_a AlZ_{3-a}$,
  (B2): a cyclic aluminoxane having a structure represented by the general formula: $\{-Al(E^2)-O-\}_b$ and
  (B3): a linear aluminoxane having a structure represented by the general formula $E^3\{Al-(E^3)-O-$ $\}_c\text{AlE}^3{}_2$, wherein each of $E^1$, $E^2$ and $E^3$ represents a hydrocarbon group, and all groups represented by $E^1$, $E^2$ and $E^3$ may be same or different, respectively, Z represents a hydrogen atom or a halogen atom, and all groups represented by Z may be same or different, "a" represents a number satisfying 0<a<3, "b" represents an integer of 2 or more and "c" represents an integer of 1 or more;

(C): a boron compound selected from any of the following (C1) to (C3),
(C2): a boron compound represented by the general formula $BQ^1Q^2Q^3$,
(C2): a boron compound represented by the general formula $G^+(BQ^1Q^2Q^3Q^4)^-$ and
(C3): a boron compound represented by the general formula $(L\text{---}H)^+(BQ^1Q^2Q^3Q^4)^-$, wherein B is a boron atom in a valence condition of 3, $Q^1$ to $Q^4$, respectively, represent a halogen atom, a hydrocarbon group, a halogenated hydrocarbon group, a substituted silyl group, an alkoxy group or a di-substituted amino group, and they may be same or different, $G^+$ represents an inorganic or organic cation, L represents a neutral Lewis acid and $(L\text{---}H)^+$ represents a Bronstead acid.

3. An ethylene-isoprene random copolymer having an isoprene content of about 1.5 to 35% by mole and having a Q-value of about 3.5 or less, wherein the Q-value is a ratio of the weight average molecular weight (Mw) to the number average molecular weight (Mn), wherein said copolymer is obtained by polymerizing ethylene and isoprene in the presence of a catalyst comprising (A) and (B), (A) and (C), or (A), (B) and (C) as set forth below:

(A): at least one transition metal complex represented by the following general formulae (I) to (III):

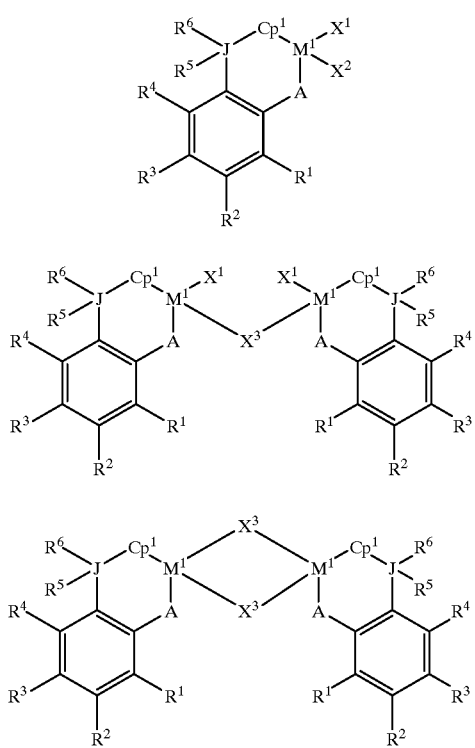

wherein in each of the above-described general formulae (I) to (III), $M^1$ represents a transition metal atom of group IV of the periodic table of elements; A represents an atom of group XVI of the periodic table of elements; J represents an atom of group XIV of the periodic table of elements; $Cp^1$ represents a group having a cyclopentadiene-type anion skeleton; $X^1$, $X^2$, $R^1$, $R^2$, $R^3$, $R^4$, $R^5$ and $R^6$ each independently represents a hydrogen atom, a halogen atom, an alkyl group, an aralkyl group, an aryl group, a substituted silyl group, an alkoxy group, an aralkyloxy group, an aryloxy group or a di-substituted amino group; $X^3$ represents an atom of group XVI of the periodic table of elements; $R^1$, $R^2$, $R^3$, $R^4$, $R^5$ and $R^6$ may optionally be connected to form a ring; and two groups represented by $M^1$, A, J, $Cp^1$, $X^1$, $X^2$, $X^3$, $R^1$, $R^2$, $R^3$, $R^4$, $R^5$ and $R^6$ in the formulae (I) to (III) may be the same or different;

(B): one or more aluminum compounds selected from the following compounds (B1) to (B3):
(B1): an organic aluminum compound represented by the general formula: $E^1{}_a\text{AlZ}_{3-a}$,
(B2): a cyclic aluminoxane having a structure represented by the general formula: $\{\text{---Al}(E^2)\text{---O---}\}_b$ and
(B3): a linear aluminoxane having a structure represented by the general formula $E^3\{\text{Al---}(E^3)\text{---O---}\}_c\text{AlE}^3{}_2$, wherein each of $E^1$, $E^2$ and $E^3$ represents a hydrocarbon group, and all groups represented by $E^1$, $E^2$ and $E^3$ may be same or different, respectively, Z represents a hydrogen atom or a halogen atom, and all groups represented by Z may be same or different, "a" represents a number satisfying 0<a≦3, "b" represents an integer of 2 or more and "c" represents an integer of 1 or more;

(C): a boron compound selected from any of the following (C1) to (C3),
(C1): a boron compound represented by the general formula $BQ^1Q^2Q^3$,
(C2): a boron compound represented by the general formula $G^+(BQ^1Q^2Q^3Q^4)^-$ and
(C3): a boron compound represented by the general formula $(L\text{---}H)^+(BQ^1Q^2Q^3Q^4)^-$, wherein B is a boron atom in a valence condition of 3, $Q^1$ to $Q^4$, respectively, represent a halogen atom, a hydrocarbon group, a halogenated hydrocarbon group, a substituted silyl group, an alkoxy group or a di-substituted amino group, and they may be same or different, $G^+$ represents an inorganic or organic cation, L represents a neutral Lewis acid and $(L\text{---}H)^+$ represents a Bronstead acid.

4. The ethylene-isoprene copolymer according to claim 1, 2 or 3, wherein said copolymer has an intrinsic viscosity [η] of 0.3 or more in xylene solvent at a temperature of 70° C.

5. The ethylene-isoprene random copolymer according to claim 1, 2 or 3 wherein A in the general formula (I), (II) or (III) is an oxygen atom.

6. The ethylene-isoprene random copolymer according to claim 1, 2 or 3 wherein $X^3$ in the general formula (I), (II) or (III) is an oxygen atom.

7. The ethylene-isoprene random copolymer according to claim 1, 2 or 3 wherein $R^1$ in the general formula (I), (II) or (III) is an alkyl group, an aralkyl group, an aryl group or a substituted silyl group.

8. The ethylene-isoprene random copolymer according to claim 1, 2 or 3 wherein $X^1$ and $X^2$ in the general formula (I), (II) or (III) are independently a halogen atom, an alkyl group, an aralkyl group, an alkoxy group, an aryloxy group or a di-substituted amino group.

9. The ethylene-isoprene random copolymer according to claim 1, 2 or 3 wherein the compound (B) is a triethylaluminum, a triisobutylaluminum or a methylaluminoxane.

10. The ethylene-isoprene random copolymer according to claim 1, 2 or 3 wherein the compound (C) is dimethylanilinium tetrakis(pentafluorophenyl)borate or triphenylmethyl tetrakis(pentafluorophenyl)borate.

11. The ethylene-isoprene random copolymer according to claim 1, 2 or 3 wherein the catalyst comprises (A), (B) and (C).

12. An elastomer composition comprising about 100 parts by weight of an ethylene-isoprene random copolymer according to claim 1, 2, or 3, about 5 to 400 parts by weight of an inorganic filler and/or carbon black, and about 0.1 to 20 parts by weight of a cross-linking agent.

13. A cross-linked elastomer composition obtained by cross-linking an elastomer composition according to claim 12.

14. An elastomer composition comprising about 100 parts by weight of a ethylene-isoprene random copolymer according to claim 4, about 5 to 400 parts by weight of an inorganic filler and/or carbon black, and about 0.1 to 20 parts by weight of a cross-linking agent.

15. A cross-linked elastomer composition obtained by cross-linking an elastomer composition according to claim 14.

16. An ethylene-isoprene random copolymer according to claim 1, 2 or 3 wherein the catalyst comprises (A) and (B).

17. An ethylene-isoprene random copolymer according to claim 1, 2 or 3 wherein the catalyst comprises (A) and (C).

18. An ethylene-isoprene random copolymer according to claim 4 wherein the catalyst comprises (A), (B) and (C).

* * * * *